United States Patent
Rodney et al.

(10) Patent No.: US 8,528,381 B2
(45) Date of Patent: Sep. 10, 2013

(54) DOWNHOLE INSTRUMENT CALIBRATION DURING FORMATION SURVEY

(75) Inventors: Paul F. Rodney, Spring, TX (US); Adan Hernandez Herrera, Houston, TX (US); Christopher Allen Golla, Kingwood, TX (US); James H. Dudley, Spring, TX (US); Joe Marzouk, Conroe, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/129,366

(22) PCT Filed: Nov. 13, 2009

(86) PCT No.: PCT/US2009/064479
§ 371 (c)(1),
(2), (4) Date: Jun. 10, 2011

(87) PCT Pub. No.: WO2010/057055
PCT Pub. Date: May 20, 2010

(65) Prior Publication Data
US 2012/0125077 A1 May 24, 2012

Related U.S. Application Data

(60) Provisional application No. 61/114,457, filed on Nov. 13, 2008, provisional application No. 61/114,466, filed on Nov. 14, 2008.

(51) Int. Cl.
*G01C 17/38* (2006.01)

(52) U.S. Cl.
USPC .......................................................... 73/1.75

(58) Field of Classification Search
None
See application file for complete search history.

(56) References Cited

U.S. PATENT DOCUMENTS

| | | | |
|---|---|---|---|
| 3,611,785 A * | 10/1971 | Hanson ........................... 73/1.75 |
| 4,071,959 A | 2/1978 | Russell et al. |
| 4,083,117 A | 4/1978 | Russell et al. |
| 4,297,790 A | 11/1981 | Van Steenwyk et al. |
| 4,682,421 A | 7/1987 | van Dongen et al. |
| 5,806,194 A | 9/1998 | Rodney et al. |
| 6,728,639 B2 | 4/2004 | Russell |
| 7,093,370 B2 | 8/2006 | Hansberry et al. |
| 2005/0022404 A1 | 2/2005 | Ash et al. |
| 2006/0106587 A1 | 5/2006 | Rodney |

OTHER PUBLICATIONS

International Application No. PCT/US2009/064479 Search Report and Written Opinion dated May 10, 2010.

* cited by examiner

*Primary Examiner* — Robert R Raevis
(74) *Attorney, Agent, or Firm* — Conley Rose, P.C.

(57) ABSTRACT

A downhole sensor calibration apparatus includes a rotational or gimbaling mechanism for guiding a sensing axis of an orientation responsive sensor through a three-dimensional orbit about three orthogonal axes. A method includes using measurements taken over the three-dimensional orbit to calibrate the sensor and determine other characteristics of the sensor or tool.

35 Claims, 24 Drawing Sheets

DOWNHOLE INSTRUMENT CALIBRATION DURING FORMATION SURVEY

CROSS-REFERENCE TO RELATED APPLICATIONS

This application is the U.S. National Stage under 35 U.S.C. §371 of International Patent Application No. PCT/US2009/064479 filed Nov. 13, 2009, entitled "Downhole Instrument Calibration During Formation Survey", which claims priority to U.S. provisional application Ser. No. 61/114,457 filed Nov. 13, 2008, entitled "Downhole Instrument Calibration During Formation Survey" and U.S. provisional application Ser. No. 61/114,466 filed Nov. 14, 2008, entitled "Downhole Instrument Calibration With Angled Sensors During Formation Survey."

BACKGROUND

During the drilling and completion of oil and gas wells, it may be necessary to engage in ancillary operations, such as evaluating the production capabilities of formations intersected by the wellbore. For example, after a well or well interval has been drilled, zones of interest are often tested to determine various formation properties such as permeability, fluid type, fluid quality, fluid density, formation temperature, formation pressure, bubble point, formation pressure gradient, mobility, filtrate viscosity, spherical mobility, coupled compressibility porosity, skin damage (which is an indication of how the mud filtrate has changed the permeability near the wellbore), and anisotropy (which is the ratio of the vertical and horizontal permeabilities). These tests are performed in order to determine whether commercial exploitation of the intersected formations is viable and how to optimize production.

Tools for evaluating or surveying formations and fluids in a well bore may take a variety of forms, and the tools may be deployed downhole in a variety of ways. For example, the evaluation tool may include a formation tester having an extendable sampling device, or probe, and pressure sensors. The evaluation tool may include a fluid identification (ID) system with sampling chambers or bottles. Sensor instrumentation, including orientation responsive sensors such as a magnetometers or accelerometers, can be used to survey the formation and create a profile, model, or image thereof. The tool may be conveyed downhole on a wireline. Often times an evaluation tool is coupled to a tubular, such as a drill collar, and connected to a drill string used in drilling the borehole. Thus, evaluation and identification of formations and fluids can be achieved during drilling operations with measurement while drilling (MWD) or logging while drilling (LWD) tools. The several components and systems just described are suitable for various combinations as one of skill in the art would understand.

The downhole environment is rugged and dynamic, sometimes including high temperatures (e.g., above 175° C.), particularly while drilling. Survey instrumentation and sensors, such as magnetometers and accelerometers, can be sensitive to high temperatures. The high temperatures create errors in the sensors, sometimes called temperature drift. Thus, it is necessary to continually calibrate the magnetometers and accelerometers in the downhole survey instrument package to account for the constant temperature drift. The principles disclosed herein address the limitations of calibrating for temperature drift and other sensor errors in prior survey instrument packages.

BRIEF DESCRIPTION OF THE DRAWINGS

For a more detailed description of the embodiments of the present disclosure, reference will now be made to the accompanying drawings, wherein.

DETAILED DESCRIPTION

Figure 1:
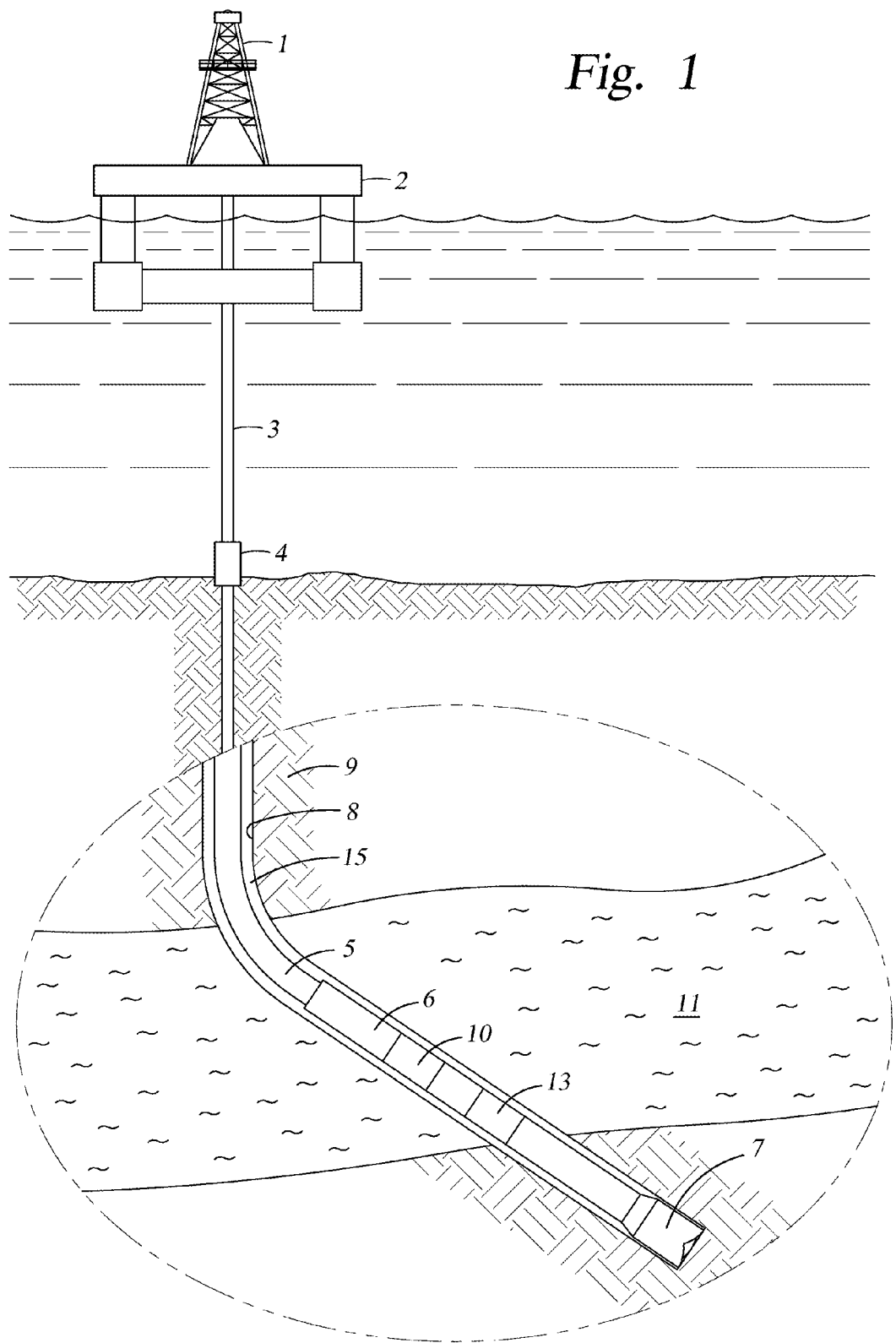
FIG. 1 is a schematic side and partially enlarged view of a conventional drilling environment including a drilling apparatus having formation testing and survey instruments.

In the drawings and description that follow, like parts are typically marked throughout the specification and drawings with the same reference numerals. The drawing figures are not necessarily to scale. Certain features of the disclosure may be shown exaggerated in scale or in somewhat schematic form and some details of conventional elements may not be shown in the interest of clarity and conciseness. The present disclosure is susceptible to embodiments of different forms. Specific embodiments are described in detail and are shown in the drawings, with the understanding that the present disclosure is to be considered an exemplification of the principles disclosed, and is not intended to limit the disclosure to that illustrated and described herein. It is to be fully recognized that the different teachings of the embodiments discussed below may be employed separately or in any suitable combination to produce desired results.

In the following discussion and in the claims, the terms "including" and "comprising" are used in an open-ended fashion, and thus should be interpreted to mean "including, but not limited to . . . ". Unless otherwise specified, any use of any form of the terms "connect", "engage", "couple", "attach", or any other term describing an interaction between elements is not meant to limit the interaction to direct interaction between the elements and may also include indirect interaction between the elements described. Reference to up or down will be made for purposes of description with "up", "upper", "upwardly" or "upstream" meaning toward the surface of the well and with "down", "lower", "downwardly" or "downstream" meaning toward the terminal end of the well, regardless of the well bore orientation. In addition, it may be sometimes stated that certain components or elements are in fluid communication. By this it is meant that the components are constructed and interrelated such that a fluid could be communicated between them, as via a passageway, tube, or conduit. Also, the designation "MWD" or "LWD" are used to mean all generic measurement while drilling or logging while drilling apparatus and systems. The various characteristics mentioned above, as well as other features and characteristics described in more detail below, will be readily apparent to those skilled in the art upon reading the following detailed description of the embodiments, and by referring to the accompanying drawings.

Referring initially to FIG. 1, a drilling apparatus including formation testing and survey instruments is shown. A downhole electronic tool 10, such as a formation survey instrument package with magnetometers and/or accelerometers, a formation tester, a formation fluid identification tool, a MWD tool, a LWD tool, a logging tool, a drilling sonde, a tubing-conveyed tool, a wireline tool, a slickline tool, a completion tool or other electronic tool, is shown enlarged and schematically as a part of a bottom hole assembly 6 including a sub 13 and a drill bit 7 at its distal most end. The bottom hole assembly 6 is lowered from a drilling platform 2, such as a ship or other conventional land platform, via a drill string 5. The drill string 5 is disposed through a riser 3 and a well head 4. Conventional drilling equipment (not shown) is supported within a derrick 1 and rotates the drill string 5 and the drill bit 7, causing the bit 7 to form a borehole 8 through formation material 9. The drill bit 7 may also be rotated using other means, such as a downhole motor. The borehole 8 penetrates subterranean zones or reservoirs, such as reservoir 11, that are believed to contain hydrocarbons in a commercially viable quantity, and which also include the Earth's magnetic field. An annulus 15 is formed thereby. It is also consistent with the teachings herein that the electronic tool 10 is employed in other bottom hole assemblies and with other drilling apparatus in land-based drilling with land-based platforms, as well as offshore drilling as shown in FIG. 1. In all instances, in addition to the electronic tool 10, the bottom hole assembly 6 contains various conventional apparatus and systems, such as a down hole drill motor, a rotary steerable tool, a mud pulse telemetry system, MWD or LWD sensors and systems, and others known in the art.

In some embodiments, the tool and bottom hole assembly may be part of a telemetry and/or electromagnetic network 50 with wired pipes, as shown in FIG. 1B. Formation testing or survey equipment 60 is coupled to a drill string 52 formed by a series of wired drill pipes 54 connected for communication across junctions using communication elements as described below. It will be appreciated that work string 52 can be other forms of conveyance, such as coiled tubing or wired coiled tubing. Other components of the network 50 may include a kelly 56, a top-hole repeater unit 58 to interface the network 100 with drilling control operations and with the rest of the world, a computer 64 in the rig control center to act as a server, and an uplink 108. The testing tool 60 with sensors 62 is shown linked into the network 100 just above the drill bit 51 for communication along its conductor path and along the wired drill string 52. As shown in FIG. 1C, a pipe section 54 of the wired drill string 52 includes conductors 70 that traverse the entire length of the pipe section. Communication elements 72 allow the transfer of power and/or data between the pipe section 54 and other pipe components 74 such as subs, couplers, and other pipes. A data/power signal may be transmitted along the pipe from one end of the tool through the conductor(s) 150 to the other end across the communication elements 155.

Figure 2:
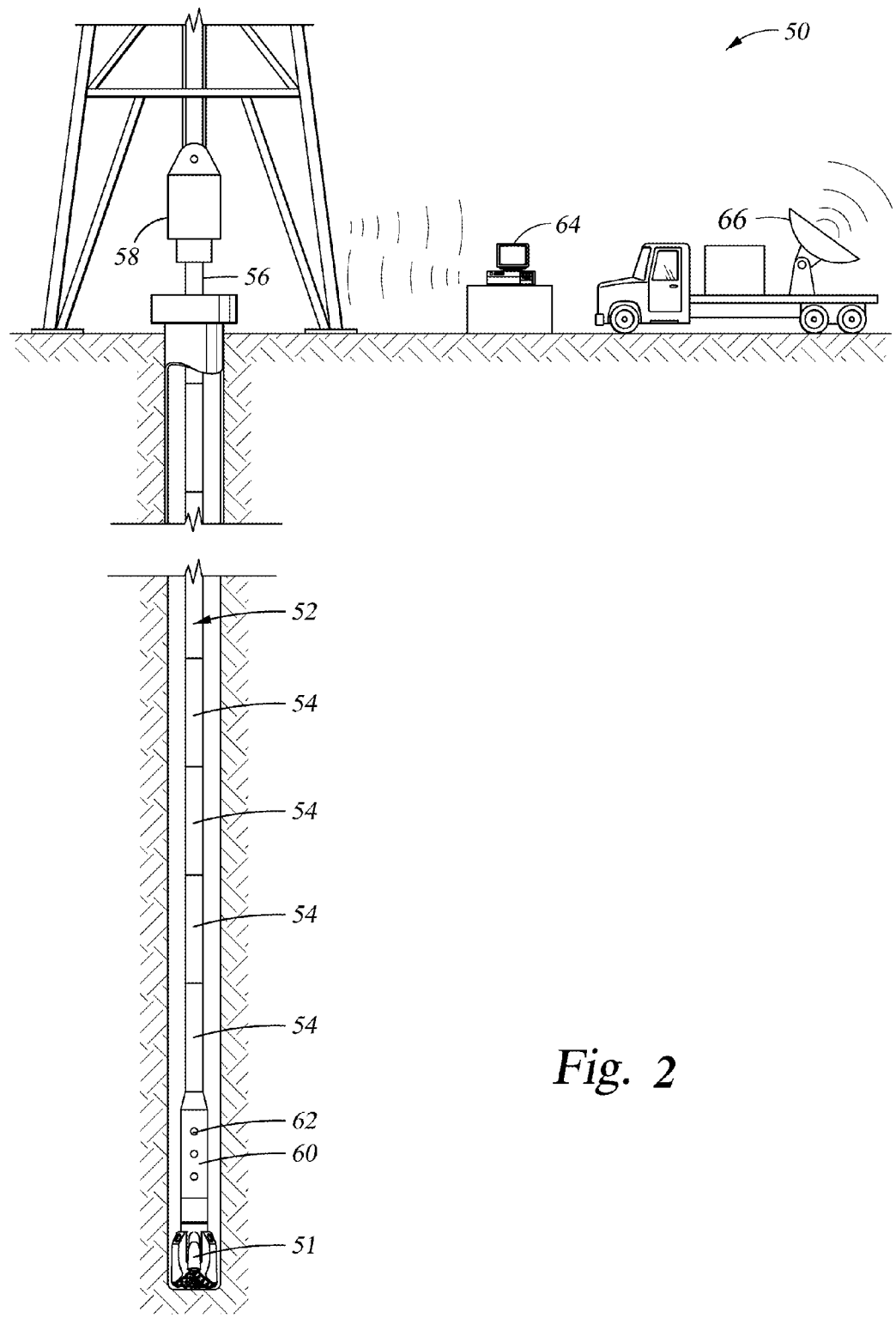
FIG. 2 is a schematic side view of a telemetry and/or electromagnetic network with wired pipe string.
Figure 3:
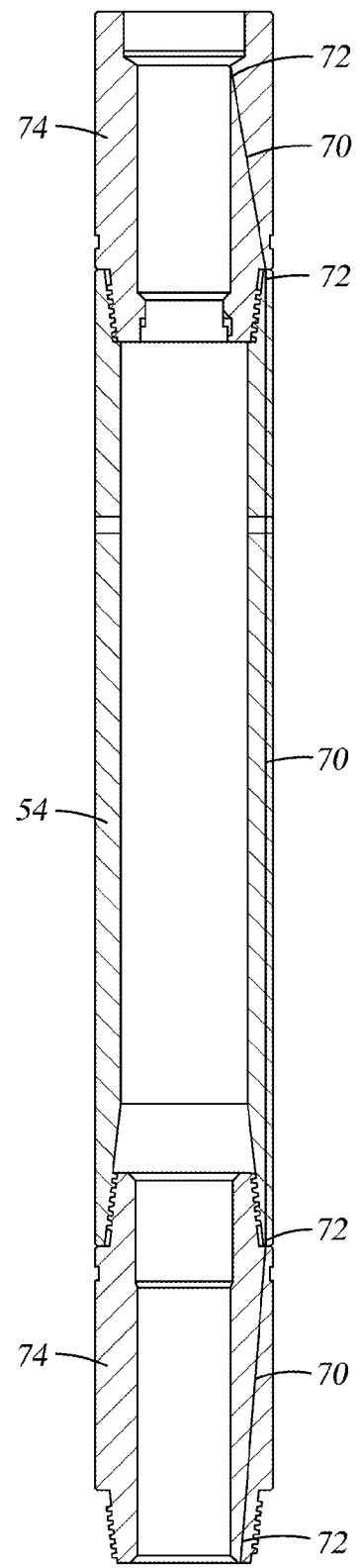
FIG. 3 is a cross-section view of a wired pip section of the wired pipe string of FIG. 2.
Figure 4:
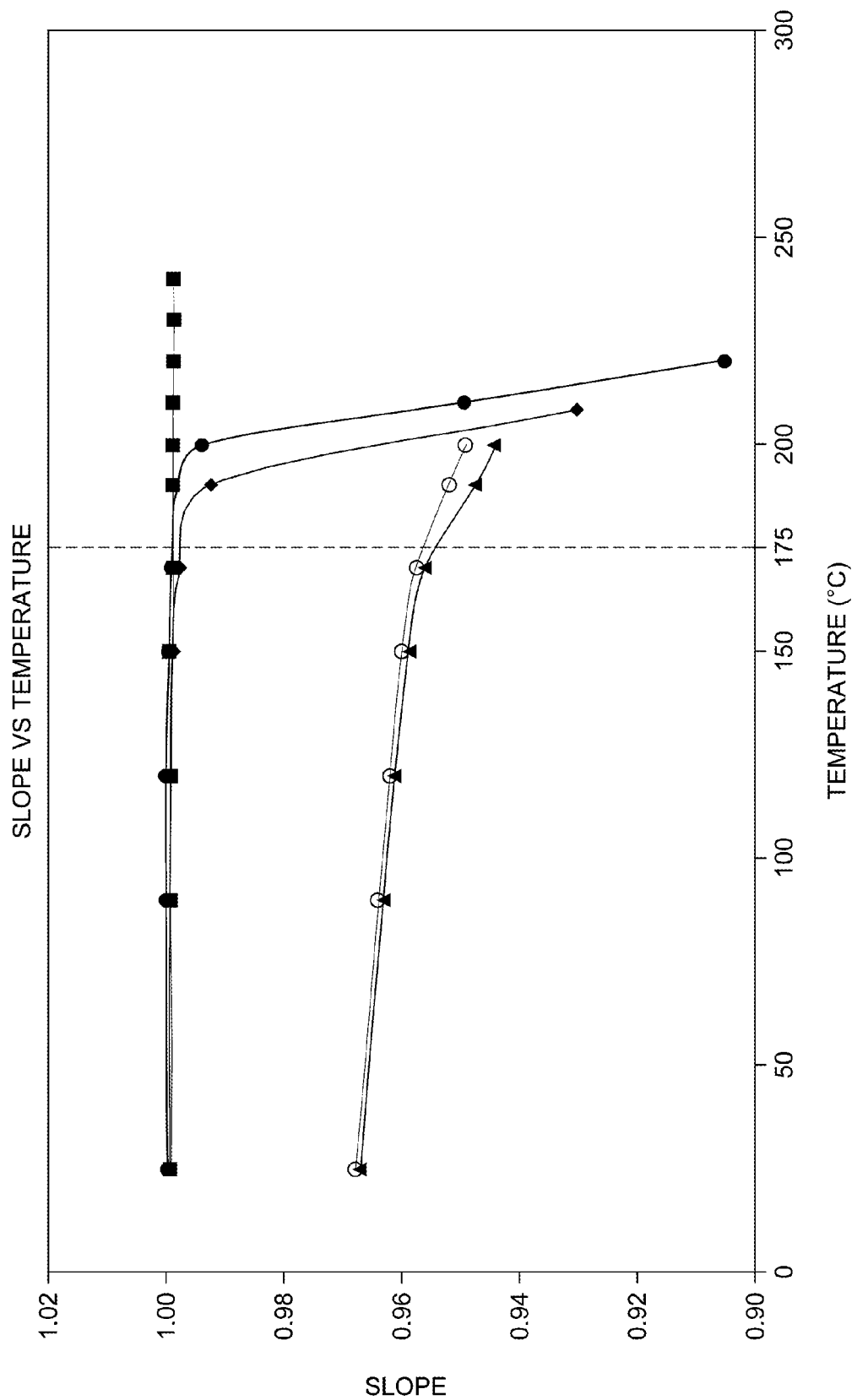
FIGS. 4-6 are graphical representations showing temperature responses of various downhole sensors at elevated temperatures.
Figure 5:
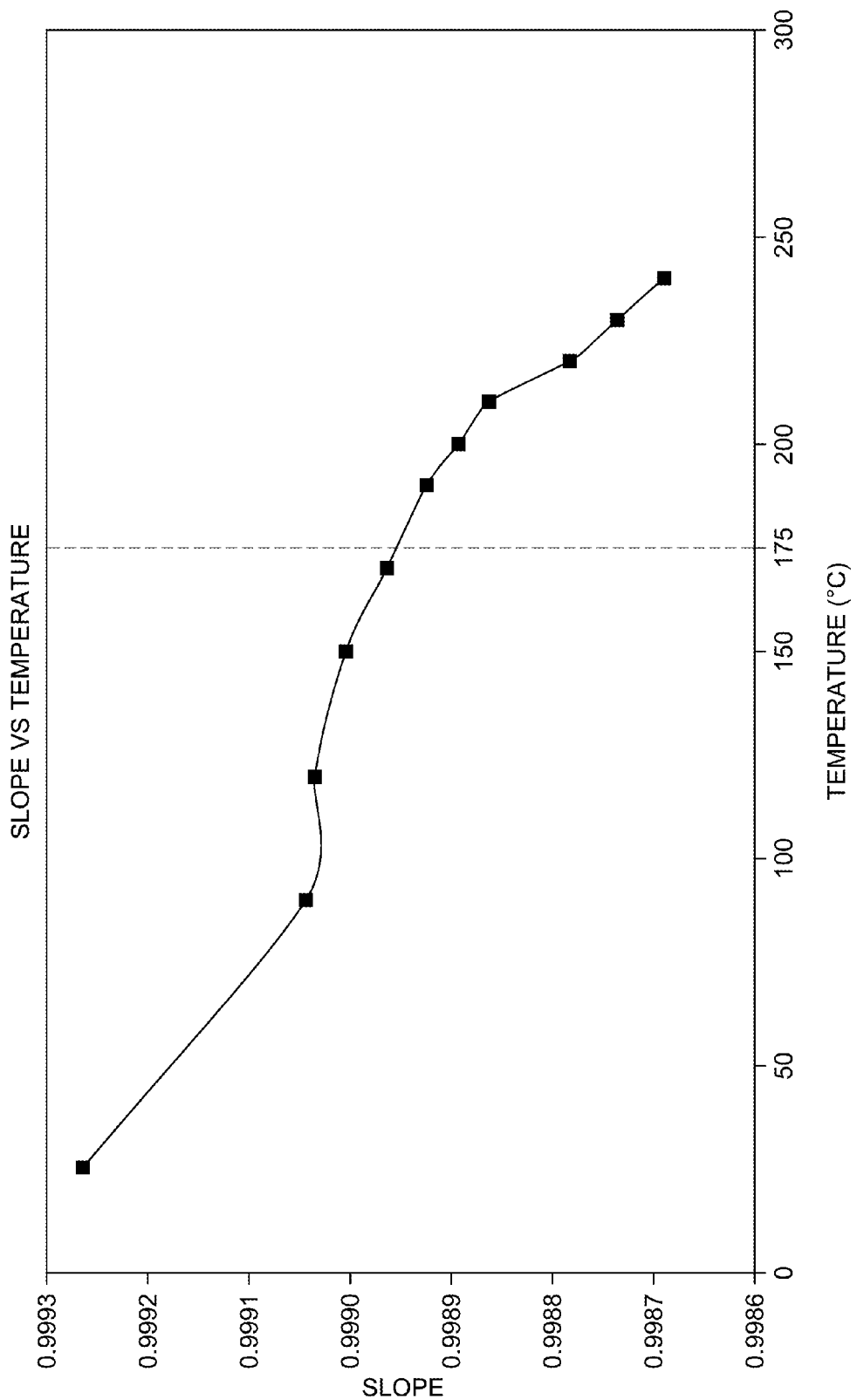
Figure 6:
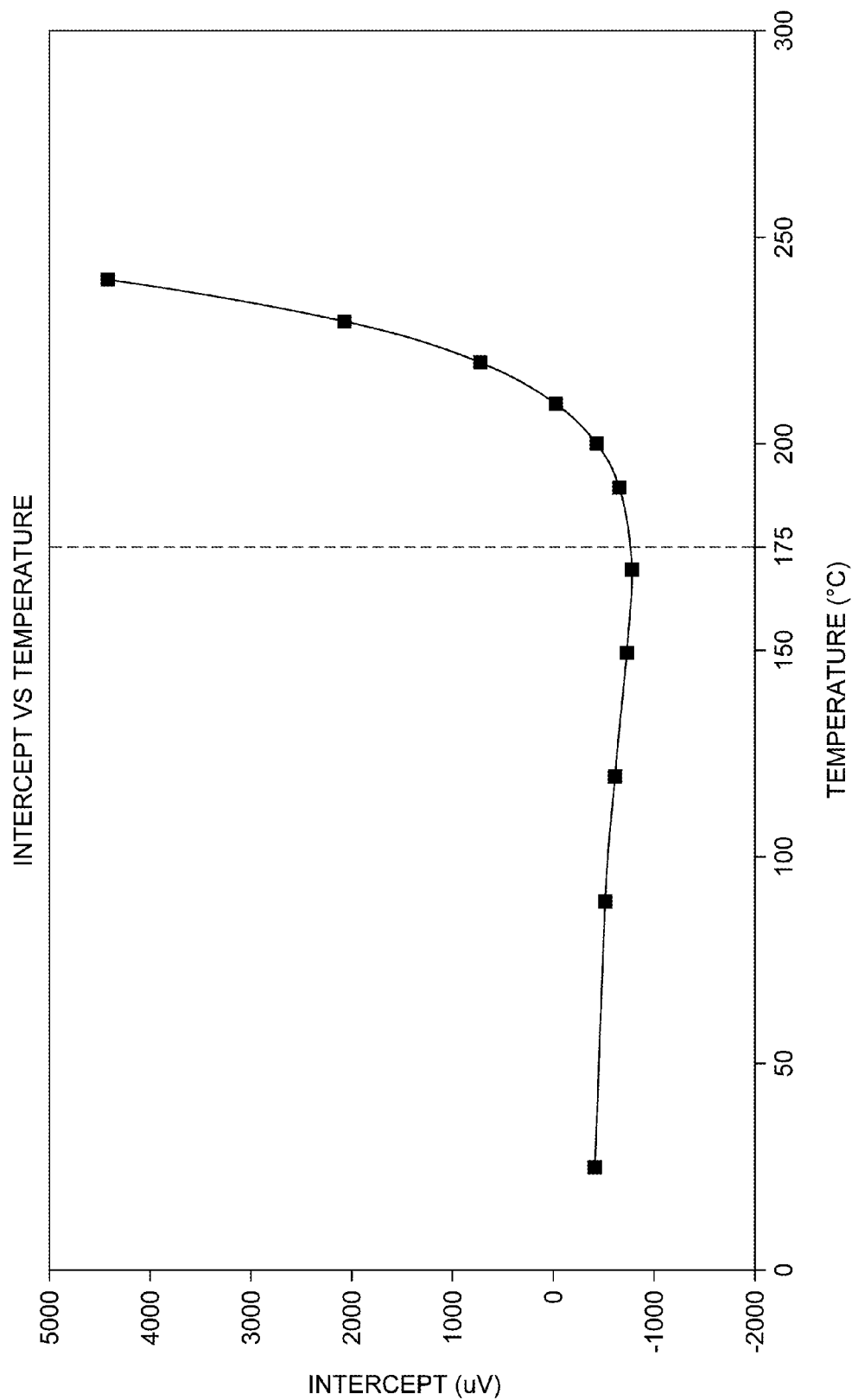

Referring now to FIGS. 2-4, graphical representations variously show instability in downhole sensors at elevated temperatures. For example, at approximately 150-175° C., the slopes of the curves representing various sensors change dramatically as a function of temperature. As shown, the overall sensor gains and biases change very rapidly at elevated temperatures. Hence, a small error in the measured temperature can result in a large error in the temperature-compensated reading obtained from a sensor using conventional lookup tables or polynomial based temperature compensation. In addition, there is great unpredictability for a calibration of the sensors at elevated temperatures, it often being the case that the calibration curve is not a repeatable function of the temperature. Thus, in some embodiments, it is necessary to calibrate the sensors in-situ, or "on the fly" or "real-time," and in very close time proximity to the time of each measurement.

Figure 7:
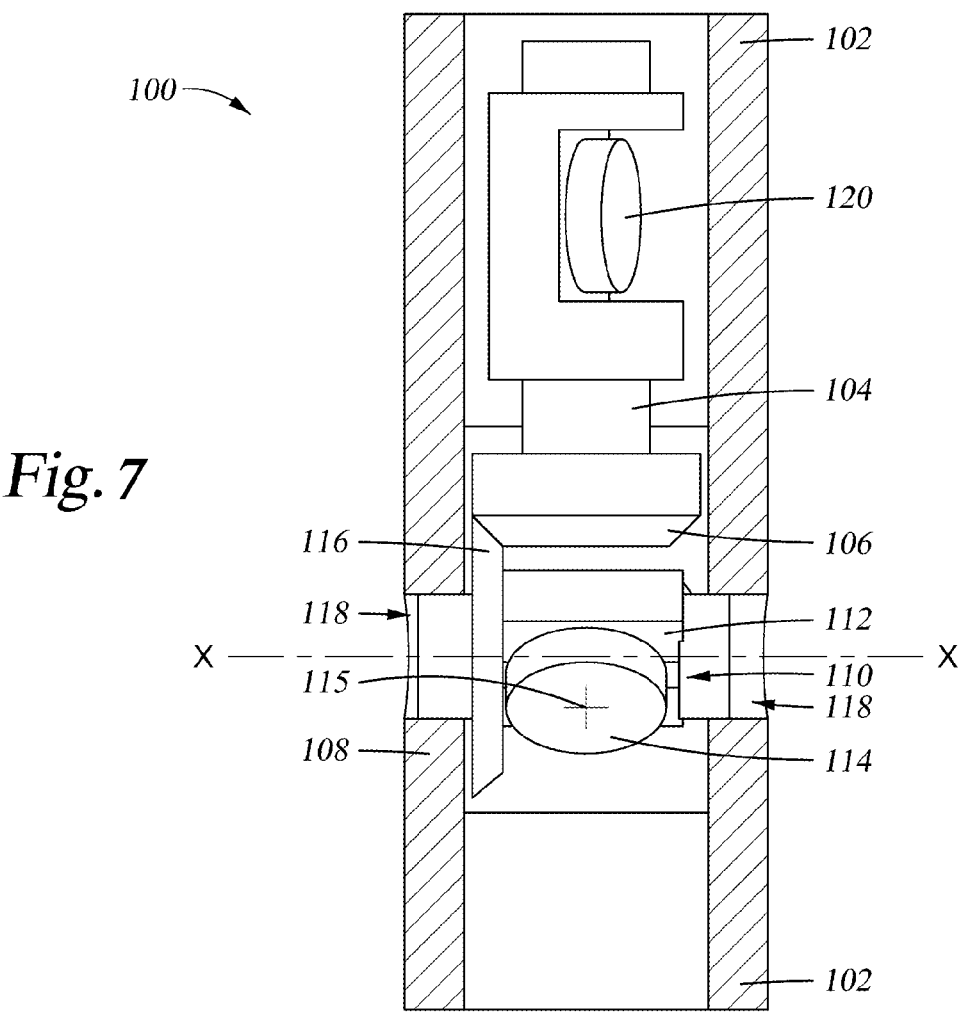
FIG. 7 is a partial cutaway view of a sensor instrument package in accordance with the principles disclosed herein.
Figure 9:
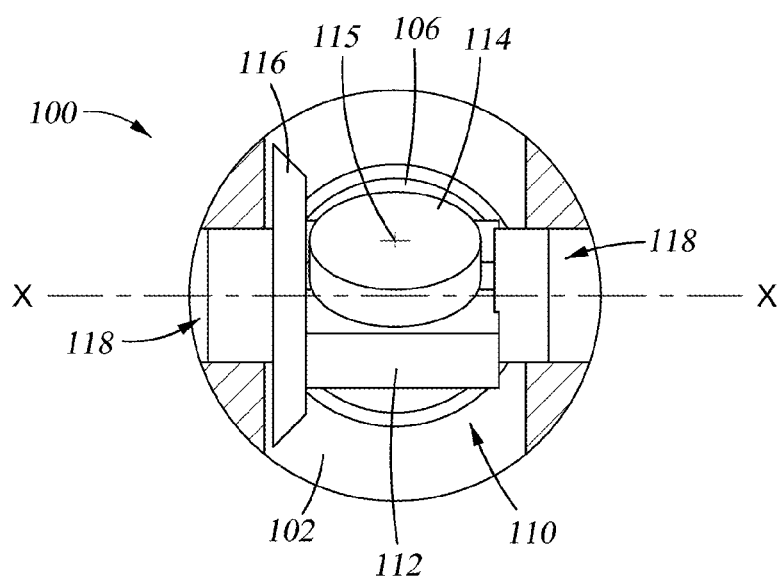
FIG. 9 is an end view of the sensor instrument package of FIGS. 7 and 8 showing a sensor chassis rotated about an X axis.
Figure 8:
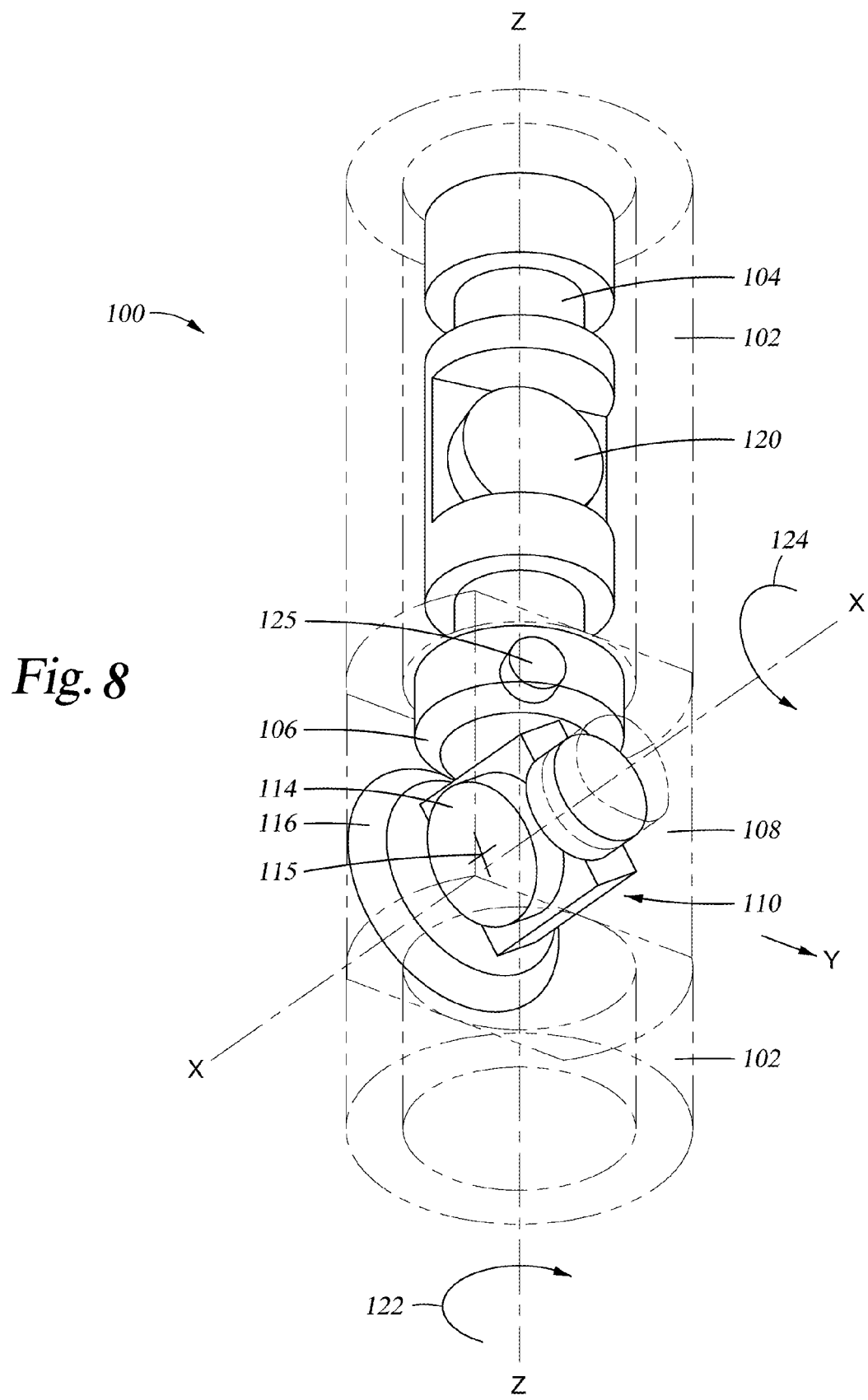
FIG. 8 is a phantom and perspective view of the sensor instrument package of FIG. 7 showing sensor rotation components.

In some embodiments, an orientation responsive sensor is rotatable about the tool or work string axis while also simultaneously being rotatable about one or more additional axes orthogonal to the tool or work string axis. Referring to FIGS. 7-9, a sensor instrument package 100 is shown. In FIG. 7, a partial cutaway view of the package 100 shows an outer housing or body 102, a shaft 104 coupled to a motion transfer member 106, and a second motion transfer member 116 engaged with the first motion transfer member 106. In some embodiments, the motion transfer members are mating and interlocking gears, or beveled gears. The gear 116 is part of a sensor chassis 110 including a sensor 114 coupled to a support 112, and cylindrical rotational support members 118 to allow the gear 116 to rotate the sensor chassis 110. The sensor 114 includes a sense or sensing axis 115. In some embodiments, the sensing axis 115 is the axis of maximum sensitivity of the sensor 114. The sensor chassis 110 is rotationally mounted in an outer cage 108, the outer cage 108 being rotationally supported by the housing 102. The outer cage is rotatable relative to the housing 102, and the sensor chassis 110 is rotatable relative to the outer cage and the housing 102.

Referring to FIG. 8, the package 100 is shown in a phantom and perspective view. The shaft 104 is rotatable about a Z axis as shown by an arrow 122. The shaft 104 is also rotatable in the direction opposite the arrow 122. The outer cage 108 is also rotatable about the Z axis, in either direction and independently of the shaft 104 rotation. The sensor chassis 110 is rotatable about an X axis as shown by an arrow 124. The sensor chassis 110 is also rotatable in the direction opposite the arrow 124. The sensor chassis 110 and the shaft 104 are operably coupled through the gearing assembly 106, 116. Rotating the outer cage 108 moves the sensor chassis 110, and thereby the sensor 114, in an XY plane to affect the X and Y directions. If the shaft 104 is held stationary while the outer cage 108 is rotated, the sensor chassis 110 is caused to rotate and to flip, as will be further described below. In some embodiments, the shaft 104 may include a second sensor 120 mounted thereon.

In one aspect, the assembly formed by the outer cage 108 and the sensor chassis 110 is a multi-axis rotational mechanism for the sensor 114. The outer cage 108 is able to rotate or "carousel" about the tool or drill string axis while the sensor chassis 110 is rotatably secured in the outer cage 108 to rotate or "gimbal" about a different axis relative to the outer cage 108 and the tool axis. In some embodiments, the gimbaling axis is orthogonal to the tool axis. The sensor chassis may also be referred to as a sensor basket. In another aspect, the assembly is a gimbaling mechanism or apparatus wherein the outer cage 108 is an outer gimbal and the sensor chassis 110 is an inner gimbal. The mating gear assembly 106, 116 is part of the drive mechanism for operating the separately moveable gimbal components.

Referring now to FIG. 9, an end view of the package 100 shows that the sensor chassis 110 is slightly rotated about the X axis to tilt the support 112, the sensor 114, and the sensing axis 115. In some embodiments, the gear 106 may be rotated to in turn rotate the gear 116 and rotate the sensor chassis 110 about the X axis. In other embodiments, the gear 106 is held stationary or fixed by the shaft 104 while the outer cage or gimbal 108 is rotated about the tool or Z axis to then cause the interlocking gear 116 to move along the stationary gear 106 and rotate the sensor chassis 110 about the inner gimbal axis.

In various embodiments, the actuators for the various movements described herein include low power, low heat-producing, and low magnetic signature actuators. For example, the actuators may include a power screw, a linear motor, gears, a pinion, and a piezo-electric motor with nano-positioning. In some embodiments, a gimbaling mechanism including one or more piezoelectric motors coupled to one or more gimbals, such as the sensor chassis 110 and the outer cage 108, is coupled to circuitry for activating the piezoelectric motors. Control circuitry is also provided for controlling the gimbal activation circuitry. In a further embodiment, the gimbaling mechanism includes a gearing assembly between a single piezoelectric motor and a plurality of gimbals. In other embodiments, a gimbaling mechanism includes a shape memory device capable of being in at least two shapes coupled to one or more gimbals, such as the sensor chassis 110, so as to drive the gimbals to at least two orientations. In a further embodiment, means for causing the shape memory device to change shapes is provided. In other embodiments, the driver of the gimbals is a stepper motor.

In some embodiments, the sensors 114, 120 are orientation responsive sensors with axes of maximum sensitivity. In some embodiments, the sensors include an accelerometer, an inclinometer, a magnetometer, or a gyroscope.

To illustrate how the sensor 114 is rotated about three orthogonal axes, or in three orthogonal planes, reference is now made to FIGS. 8-13. In FIG. 8, a perspective view of an instrument survey package 200 is shown with partial cut-outs and some components in phantom for clarity. A housing 202 supports the components of the package 200, including a rotatable inner shaft 204 having a gear 206 engaged with a gear 216 in a sensor chassis, basket, or inner gimbal 210. The sensor chassis 210 includes a sensor 214 coupled to a support 212, and rotational support members 218 to allow the gear 216 to rotate the support 212 and sensor 214 about an X axis. An outer cage or gimbal 208 is rotatable about a Z axis independent of the rotatable shaft 204. The sensor 214 is positioned in a Y+ direction, wherein the sensing axis of the sensor 214 is aligned with the Y+ direction.

Figure 11:
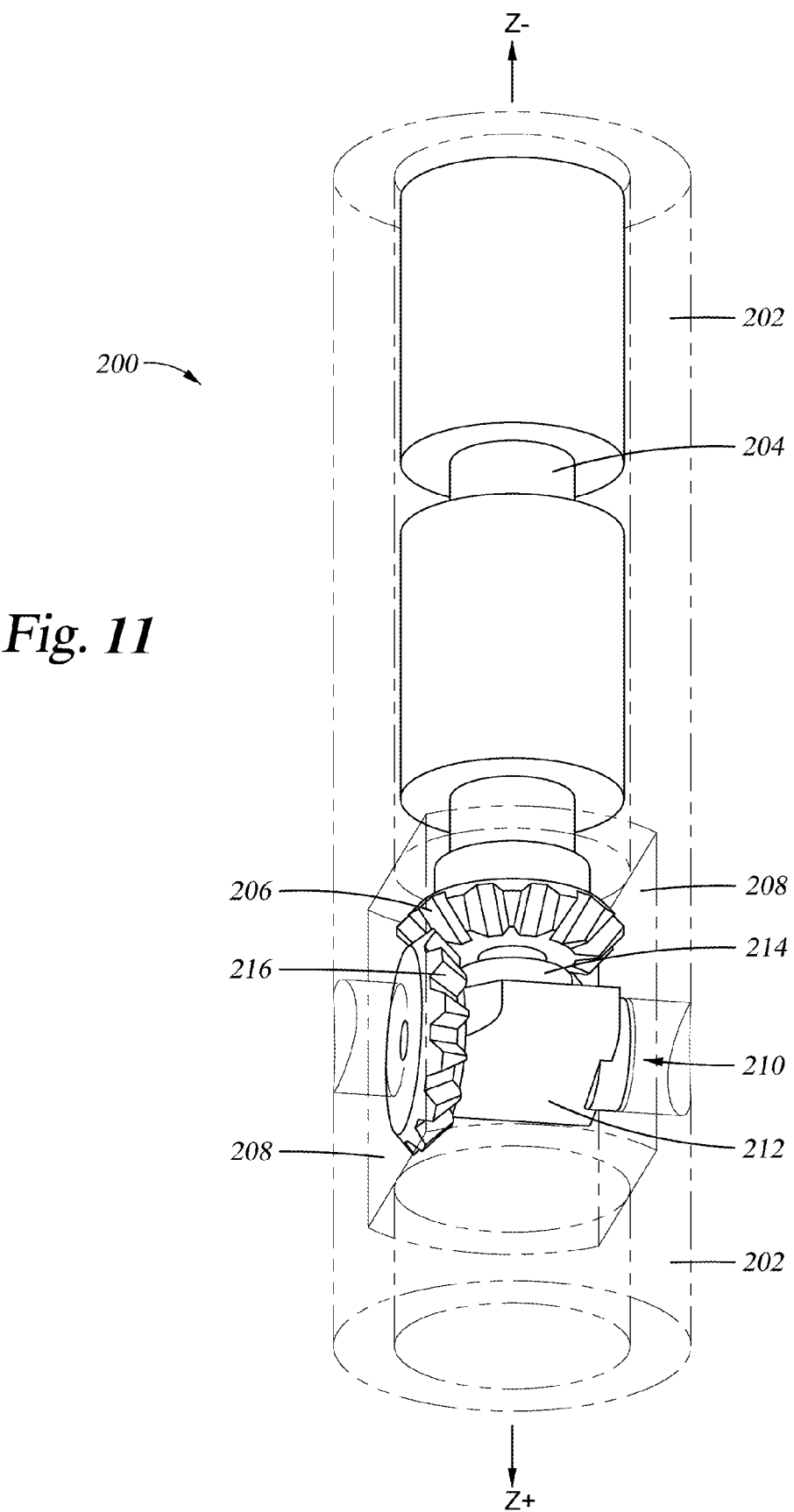
FIG. 11 shows the sensor instrument package of FIG. 10 where the sensor rotation components have realigned with the sensor with a Z− axis.

Referring now to FIG. 11, while the inner shaft 204 is held stationary, an actuator is powered to rotate the outer cage 208 about the Z axis as shown. As the outer cage 208 rotates, the gear 216 moves along the fixed gear 206 to simultaneously rotate the sensor chassis 210. This dual rotation positions the sensor 214 in a new position in a Z− direction, wherein sensing axis of the sensor 214 is aligned with the Z− axis.

Figure 12:
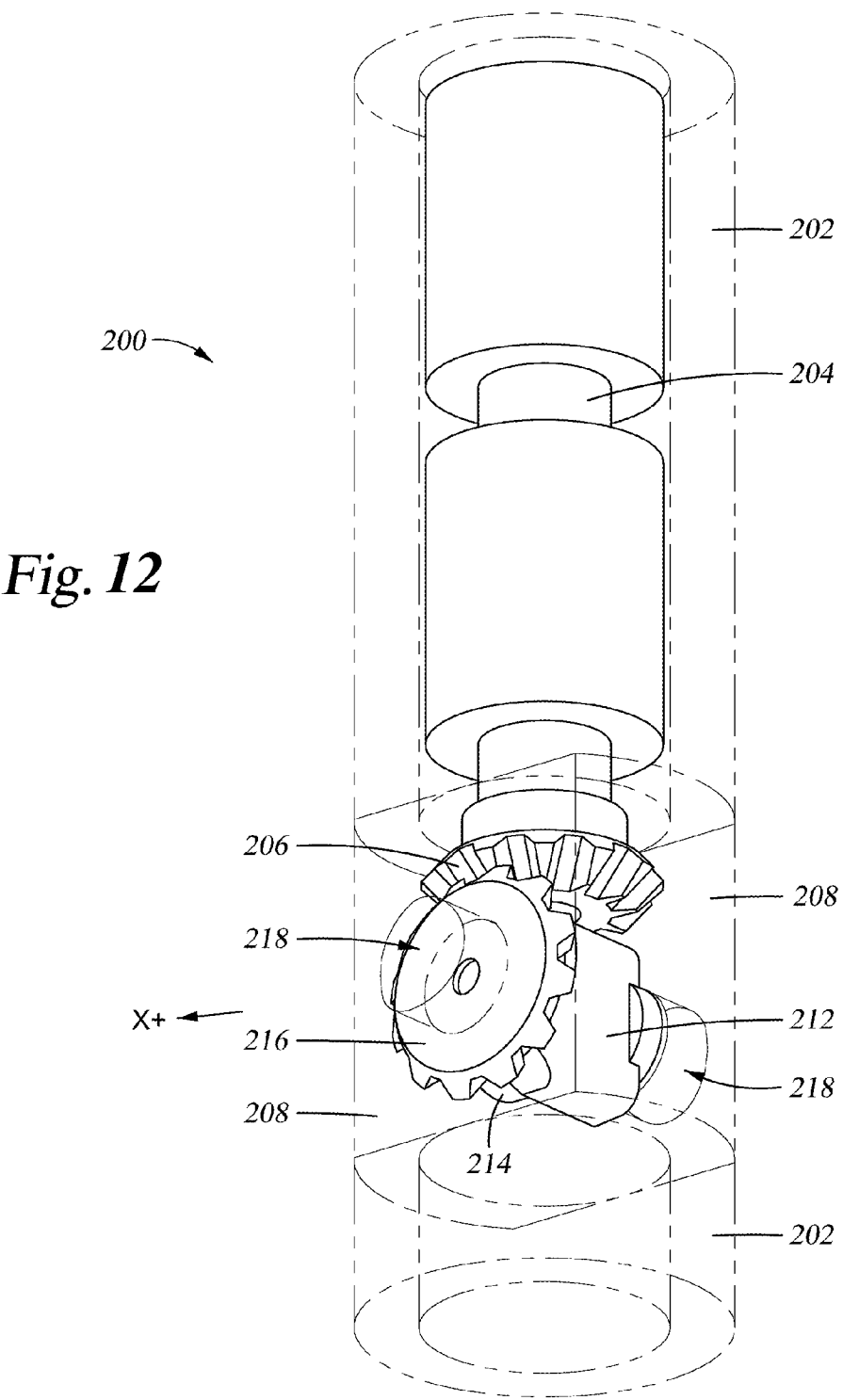
FIG. 12 shows the sensor instrument package of FIGS. 10 and 11 where the sensor rotation components have realigned the sensor with an X+ axis.

Referring next to FIG. 12, the outer cage 208 continues to rotate while the shaft 204 and the gear 206 are fixed. The gear 216 continues to move along the fixed gear 206, now placing the sensor 214 in a new position in an X+ direction as shown. The sensing axis of the sensor 214 is aligned with the X+ axis.

Figure 13:
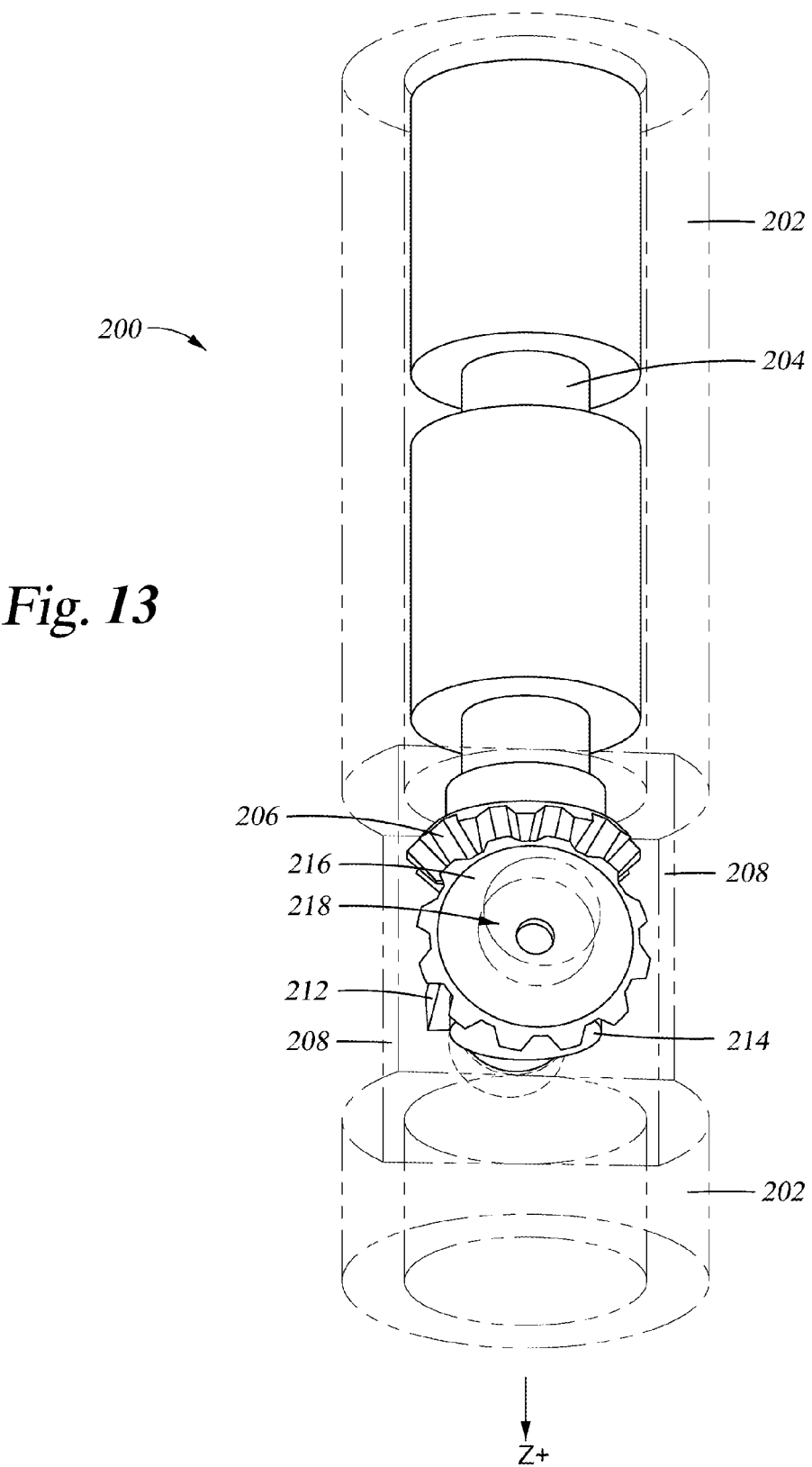
FIG. 13 shows the sensor instrument package of FIGS. 10-12 where the sensor rotation components have realigned the sensor with an Z+ axis.

Referring next to FIG. 13, the outer cage 208 continues to rotate while the shaft 204 and the gear 206 are fixed. The gear 216 continues to move along the fixed gear 206 to place the sensor 214 in a new position in a Z+ direction as shown. The sensing axis of the sensor 214 is aligned with the Z+ axis.

Figure 14:
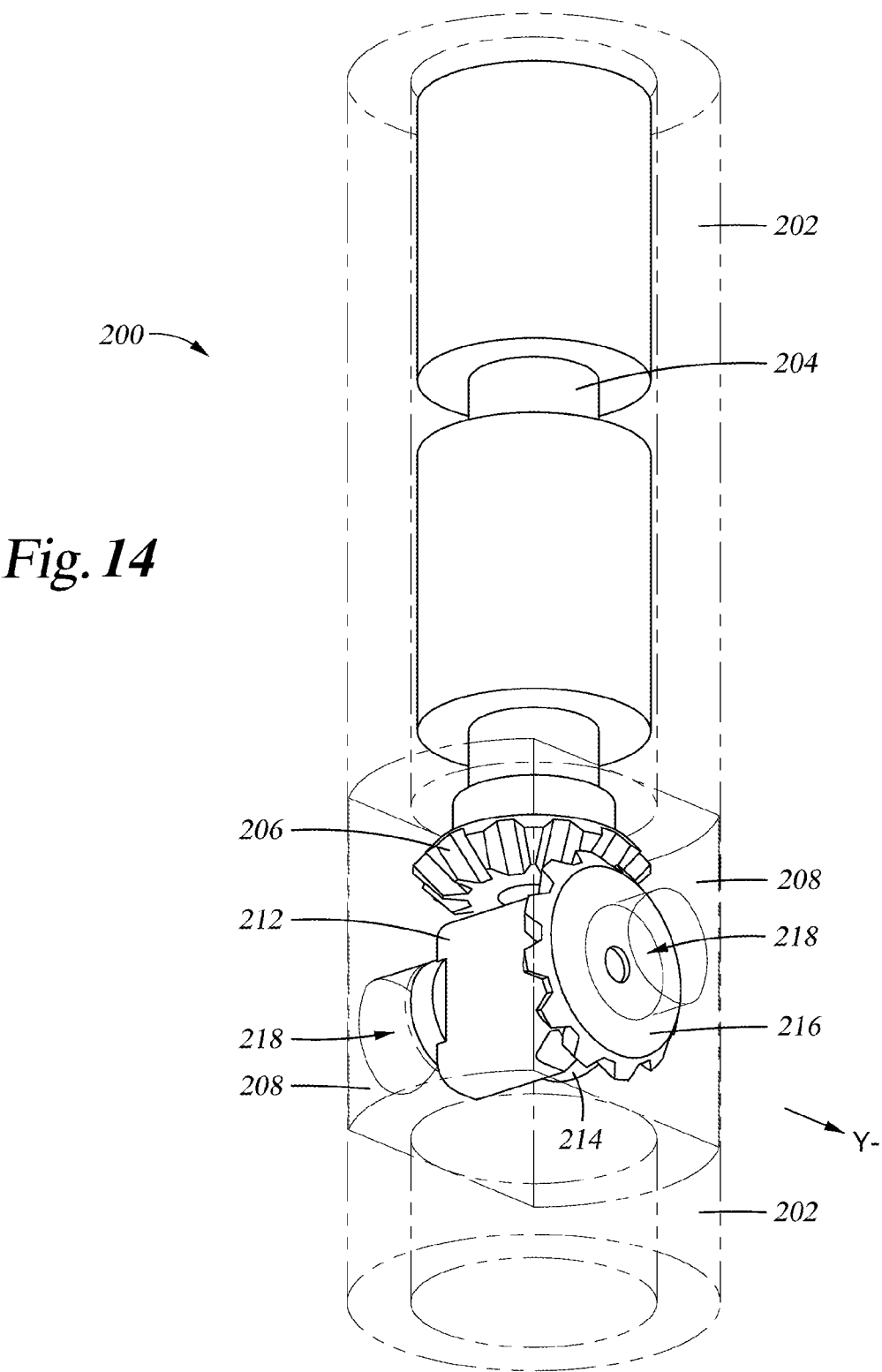
FIG. 14 shows the sensor instrument package of FIGS. 10-13 where the sensor rotation components have realigned the sensor with an Y− axis.

Referring now to FIG. 14, the outer cage 208 continues to rotate while the shaft 204 and the gear 206 are fixed. The gear 216 continues to move along the fixed gear 206 to place the sensor 214 in a new position in a Y− direction as shown. The sensing axis of the sensor 214 is aligned with the Y− axis.

Figure 15:
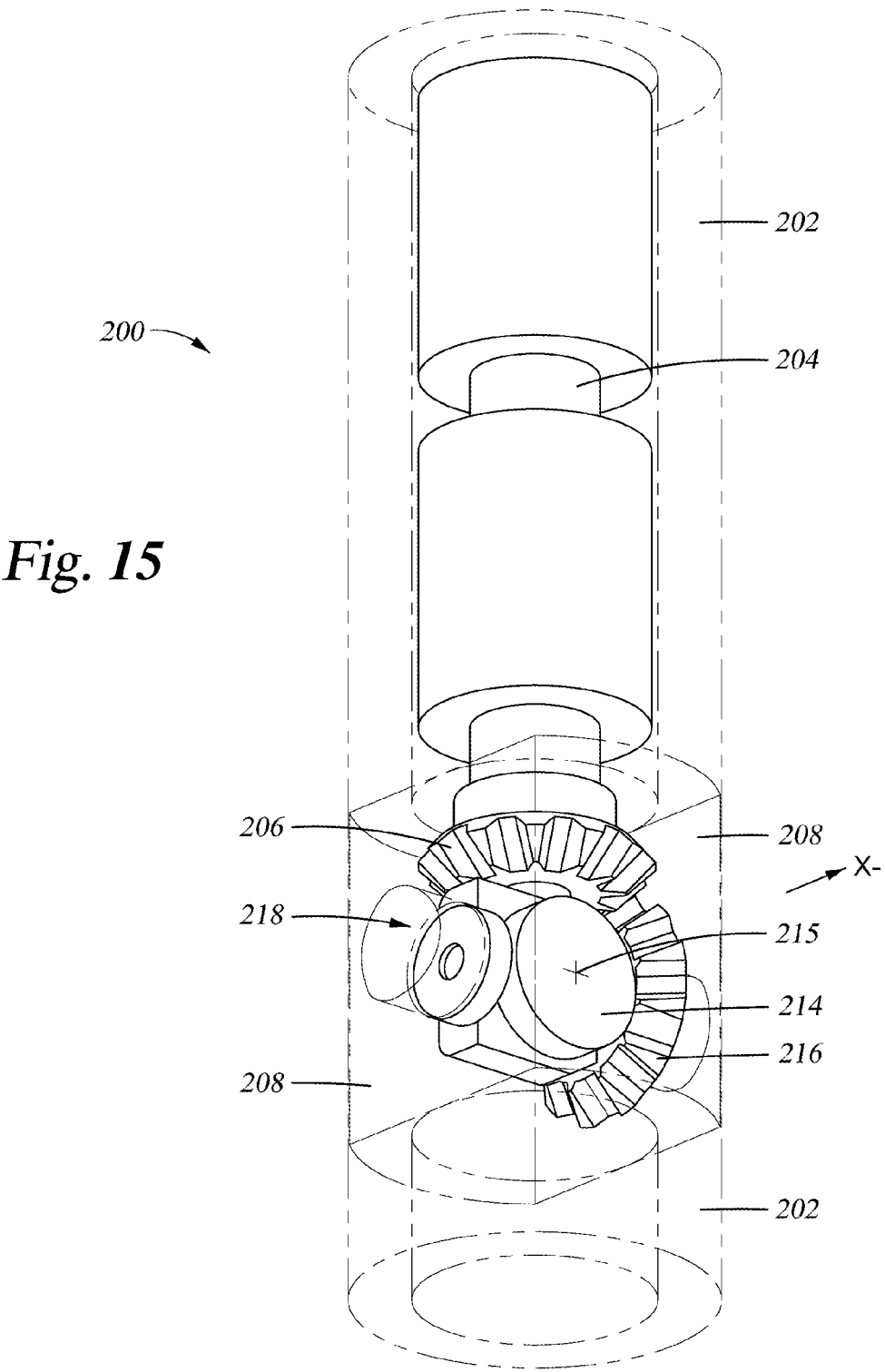
FIG. 15 shows the sensor instrument package of FIGS. 10-14 where the sensor rotation components have realigned the sensor with an X− axis.

Finally, referring to FIG. 15, the outer cage 208 continues to rotate while the shaft 204 and the gear 206 are fixed. The gear 216 continues to move along the fixed gear 206 to now place the sensor 214 in a position in an X− direction as shown. The sensing axis of the sensor 214 is aligned with the X− axis.

In some embodiments, a 1:1 ratio between the gears 106, 116 will cause the sensor chassis 110 to flip between alignment with the Y axis and the Z axis. If the outer cage 108 is rotated while holding the inner shaft stationary, as is detailed herein, a larger gear ratio will allow the sensor chassis to orient in multiple directions. In some embodiments, rotating the outer cage 108 and the shaft 104 together will align the sensor 114 with the X axis or the Y axis, or rotate the sensor 114 in the XY plane. In other embodiments, rotating only one of either the outer cage 108 or the shaft 104 will flip the sensor chassis to align with the Z axis and be in the XZ or the YZ plane (or simply the Z plane).

Figure 16:
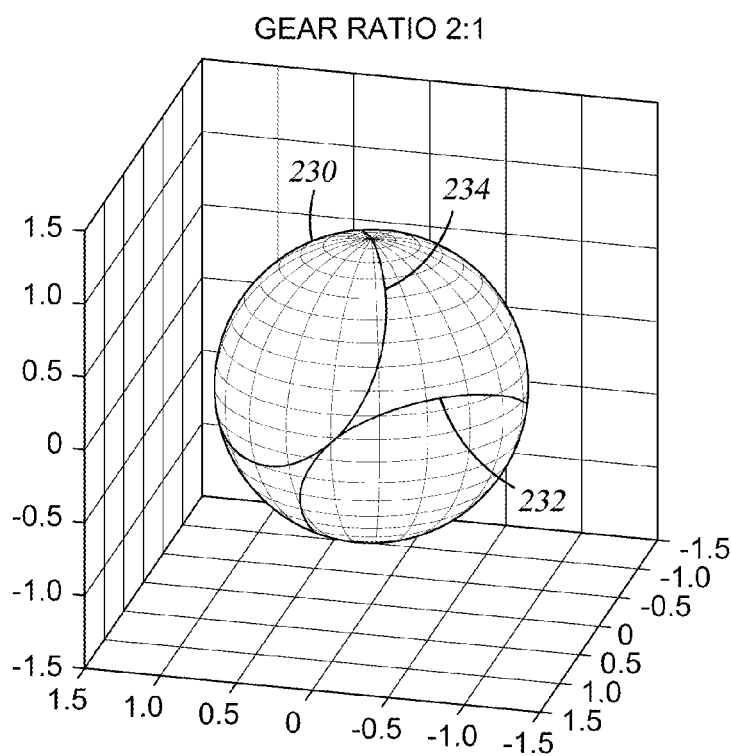
FIG. 16 is a three-dimensional grid including a three-dimensional sphere along which a sensing axis of the sensor orbits with a 2:1 gear ratio.
Figure 17:
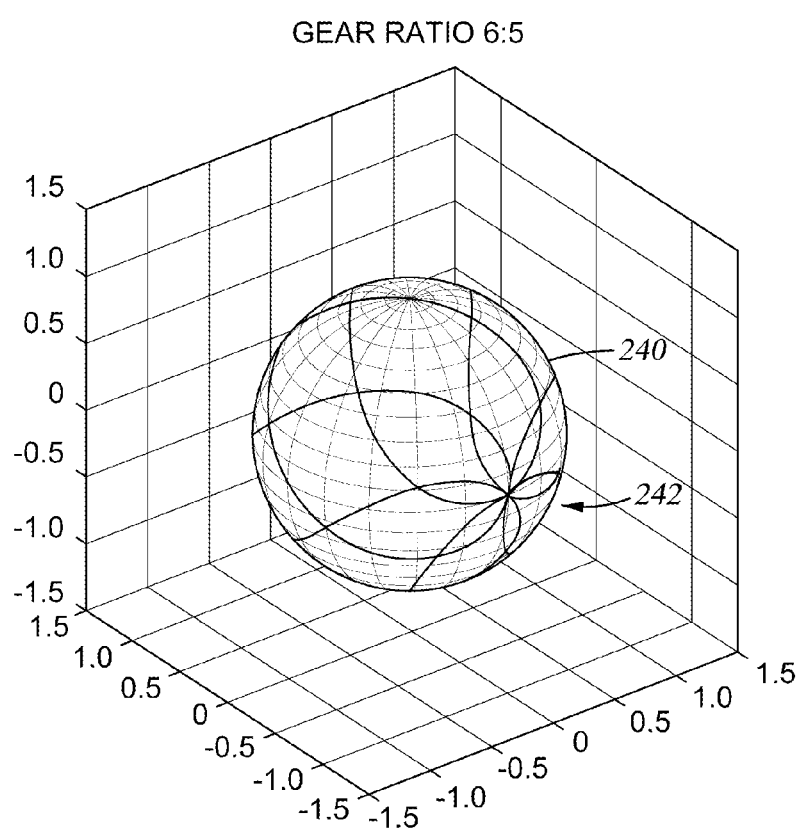
FIG. 17 is a three-dimensional grid including a three-dimensional sphere along which the sensing axis of the sensor orbits with a 6:5 gear ratio.

In some embodiments, the gear ratio of the gears 206, 216 is varied to produce desired results. In some embodiments, the gear ratio is 2:1 to direct the sensor 214 and its sensing axis in all of the positive and negative orientations along the three orthogonal axes X, Y and Z as described. With reference to FIG. 16, a 2:1 gear ratio will guide the sensing axis of the sensor 214 through three-dimensional orbits 232, 234 on a three-dimensional sphere 230. In other embodiments, and with reference to FIG. 17, the gear ratio is adjusted to 6:5 to cause the gimbaled sensor 214 to direct its sensing axis along more three-dimensional orbits such as a series of three-dimensional orbits 242 on a three-dimensional sphere 242. In other embodiments, the gear ratio is further adjusted to adjust the number and types of three-dimensional orbits through which the sensing axis is moved on the imaginary three-dimensional sphere.

Figure 18:
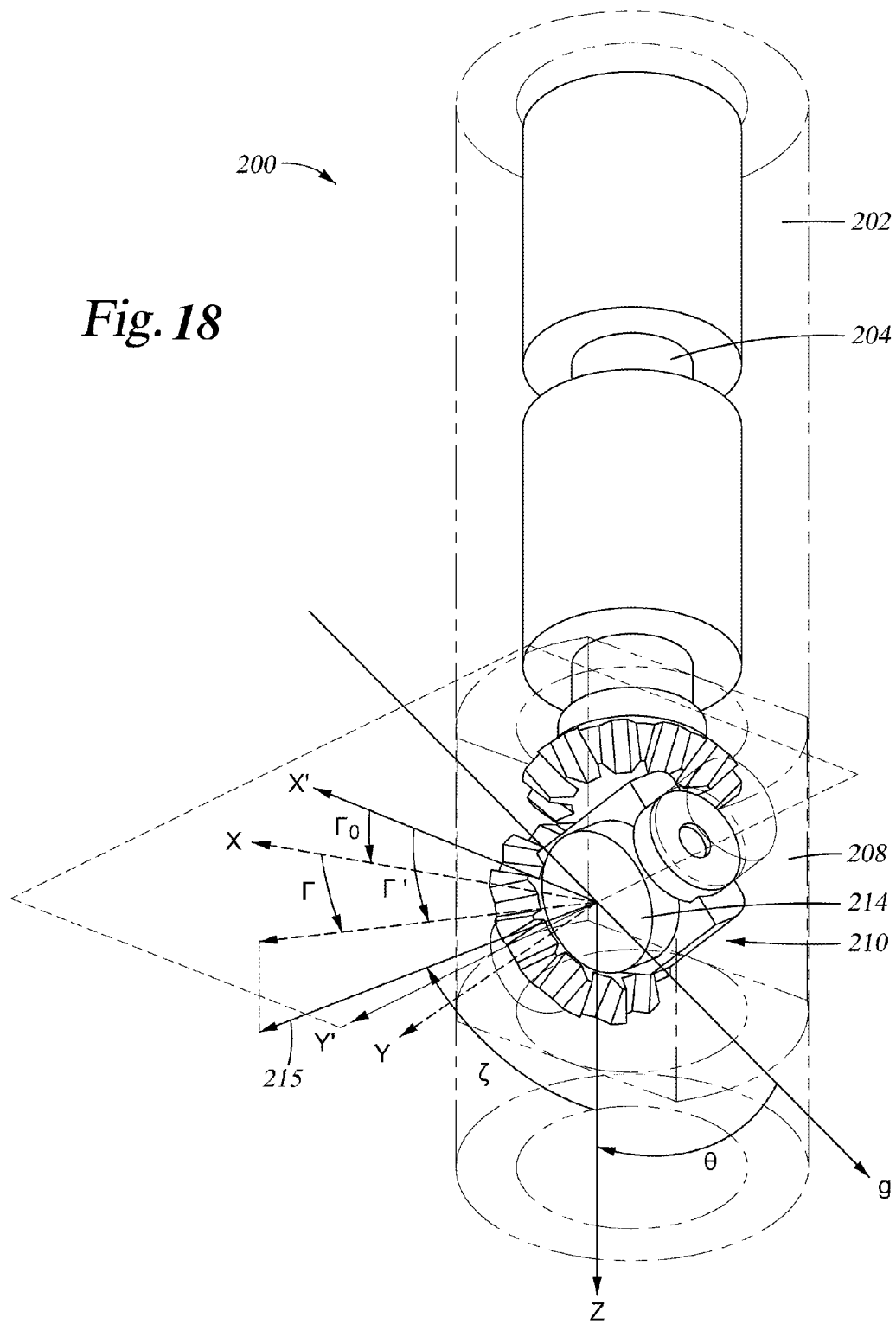
FIG. 18 and 19 show various geometrical relationships for the sensor instrument package of FIGS. 10-15.
Figure 19:
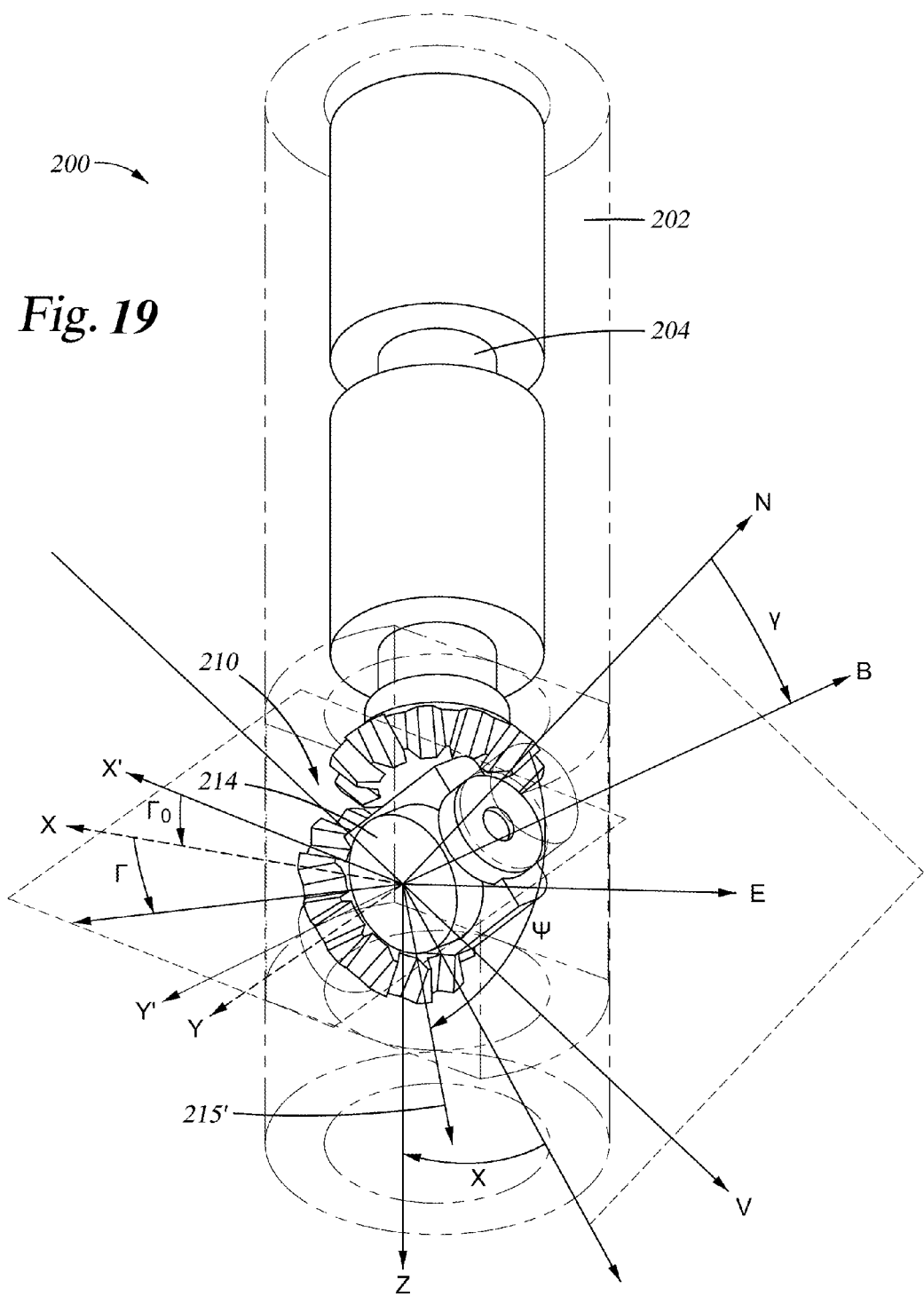
Figure 20:
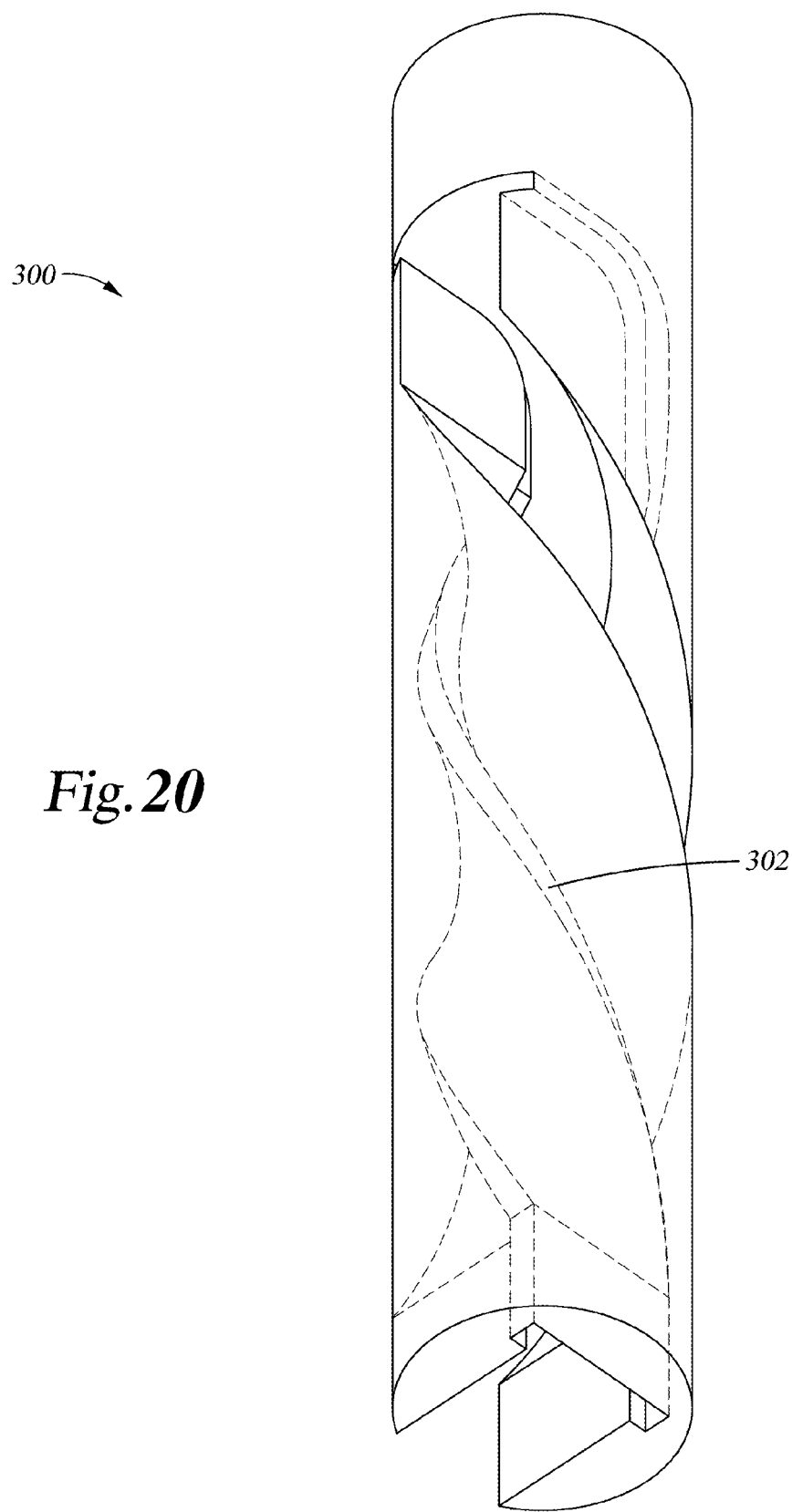
FIG. 20 is a perspective view of another sensor instrument package according to the principles disclosed herein and including a sensor mounted in a tri-axis, helical track.
Figure 21:
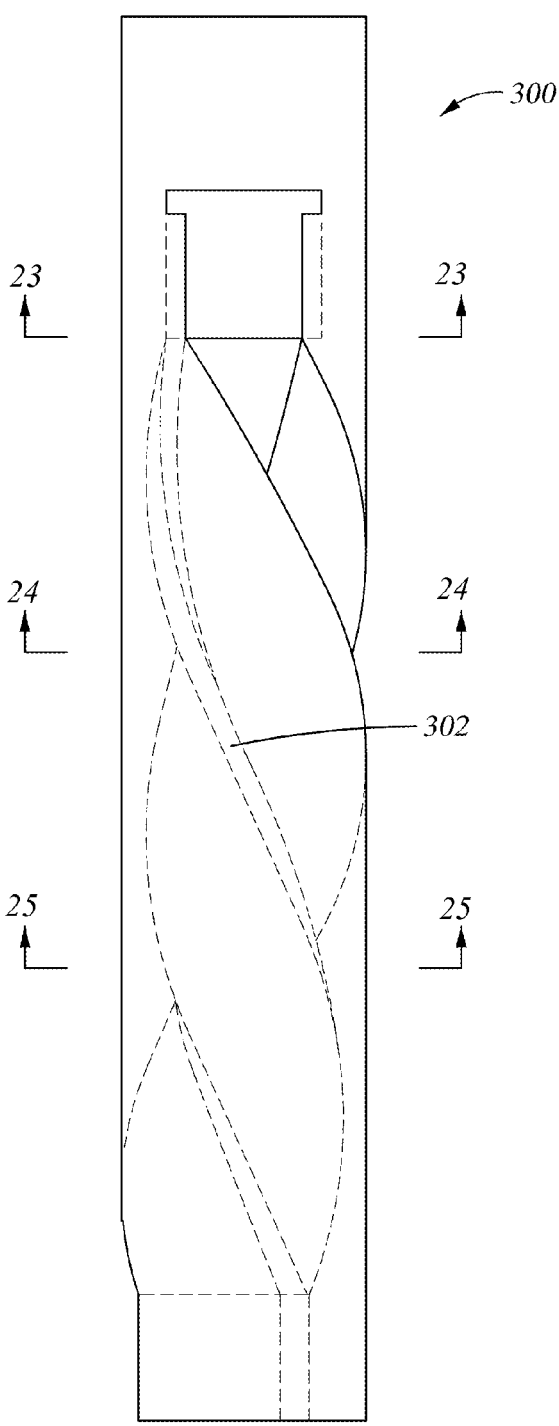
FIG. 21 is a side view of the sensor and track of FIG. 20.
Figure 22:
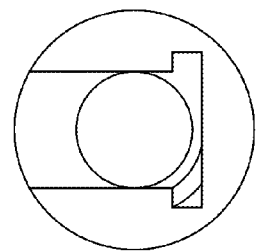
FIG. 22 is an end view of the track of FIG. 20 and 21.
Figure 23:
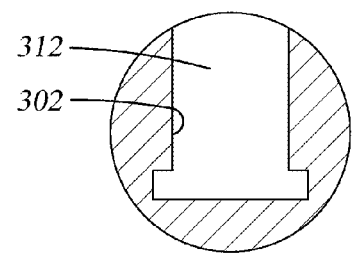
FIG. 23-25 are cross-section views of the track of FIG. 21.
Figure 24:
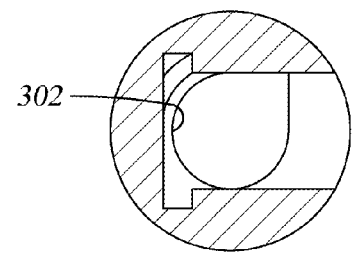
Figure 25:
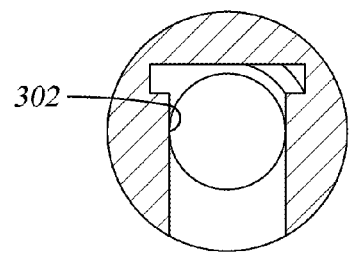

The gimbaling of the orientation responsive sensors as described above creates certain geometries, definitions, information, and responses that can be used in calibrating the sensors and gathering further survey information. Referring to FIGS. 18 and 19, the sensor package 200 includes the outer gimbal 208 and the inner gimbal 210 with sensor 214. The position of the package 200 corresponds to a tool orientation at a particular survey station i. Further, $\theta$=inclination angle at the orientation i, $\zeta$=angle between the accelerometer axis of sensitivity 215 and the tool axis Z at orientation i, $\zeta_0$=offset in $\zeta$, $\Gamma$=angle of rotation of the outer housing 202 and is measured with respect to the X axis, and $\Gamma_0$=tool face, which is the angle at which the sensing axis 215 lies in the plane containing the Z axis and the g vector. For the particular gimbal and sensor orientation shown, $\zeta=\pi/2$ when $\Gamma=\Gamma_0$ in the absence of any offset. Consequently, an exemplary response model may be an inclination response model as follows:

$$\zeta = \left(G_r\Gamma + \frac{\pi}{2}\right) + \zeta_0$$

$$C = b + SF(-\sin(\theta)\sin(\zeta)\cos(\Gamma+\Gamma_0)+\cos(\theta)\cos(\zeta))$$

As shown in FIG. 19, further geometries can be defined with N, B, E, and V axes and a projection 215' of the sensing axis on the NE plane.

Figure 26:
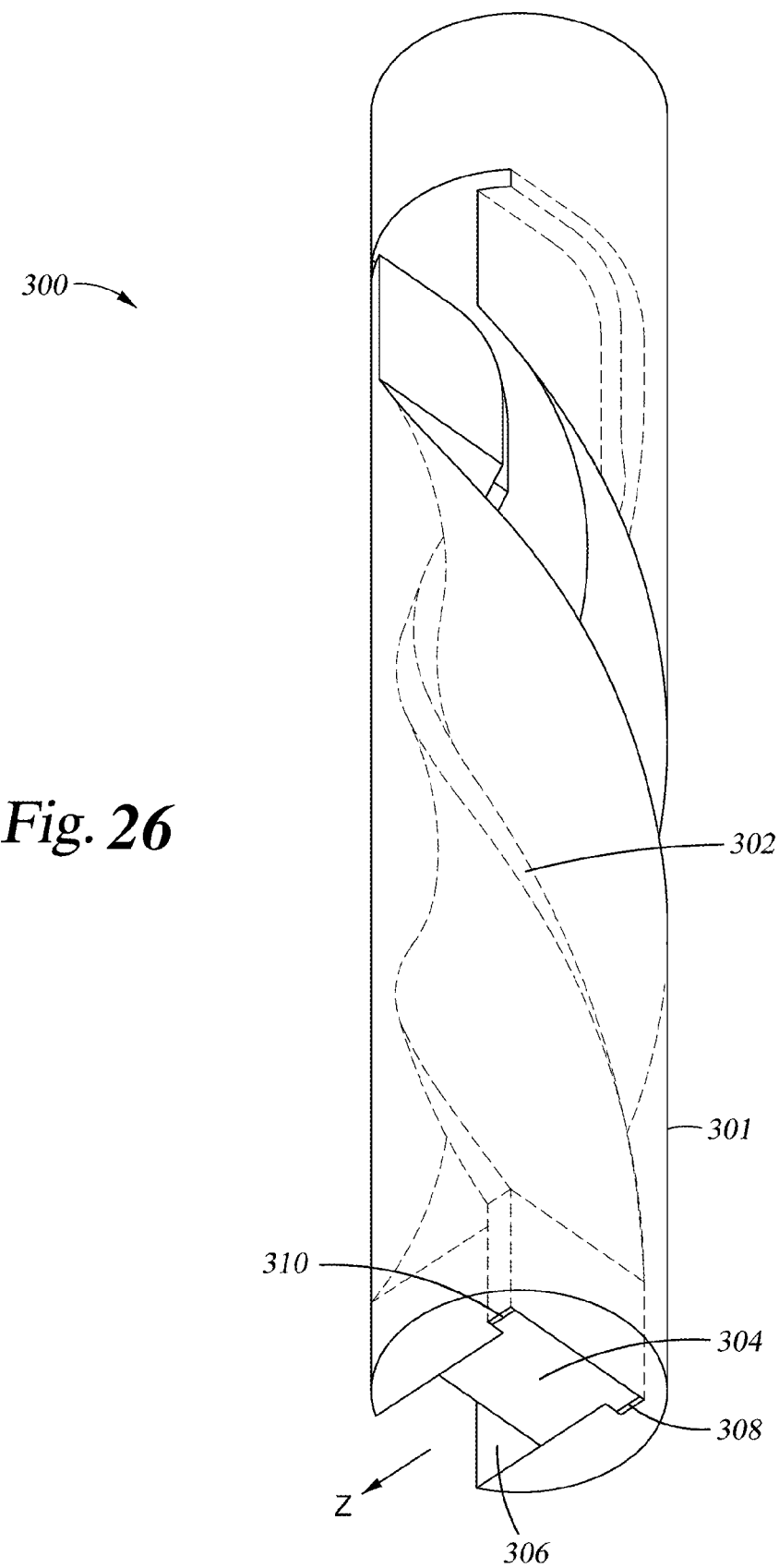
FIG. 26 is the track of FIG. 20 with the sensor having a Z axis orientation as shown.

In alternative embodiments, the axis of sensitivity of the sensor being calibrated, or the Z axis of the sensor, can be oriented according to the principles described herein using other mechanisms. For example, with reference to FIGS. 20-30, a sensor survey package 300 comprises a tri-axis rotational mechanism for guiding an orientation responsive sensor about three orthogonal axes. The sensor package 300 includes an internal helical track 302 for guiding a sensor through a variety of Z-sensing-axis orientations. Referring to FIG. 26, a body 301 of the package 300 includes the internal helical track 302. An open end 306 receives a sensor 304 having guide rails 308 mating with grooves 310. The sensor includes a Z axis orientation as shown.

Figure 27:
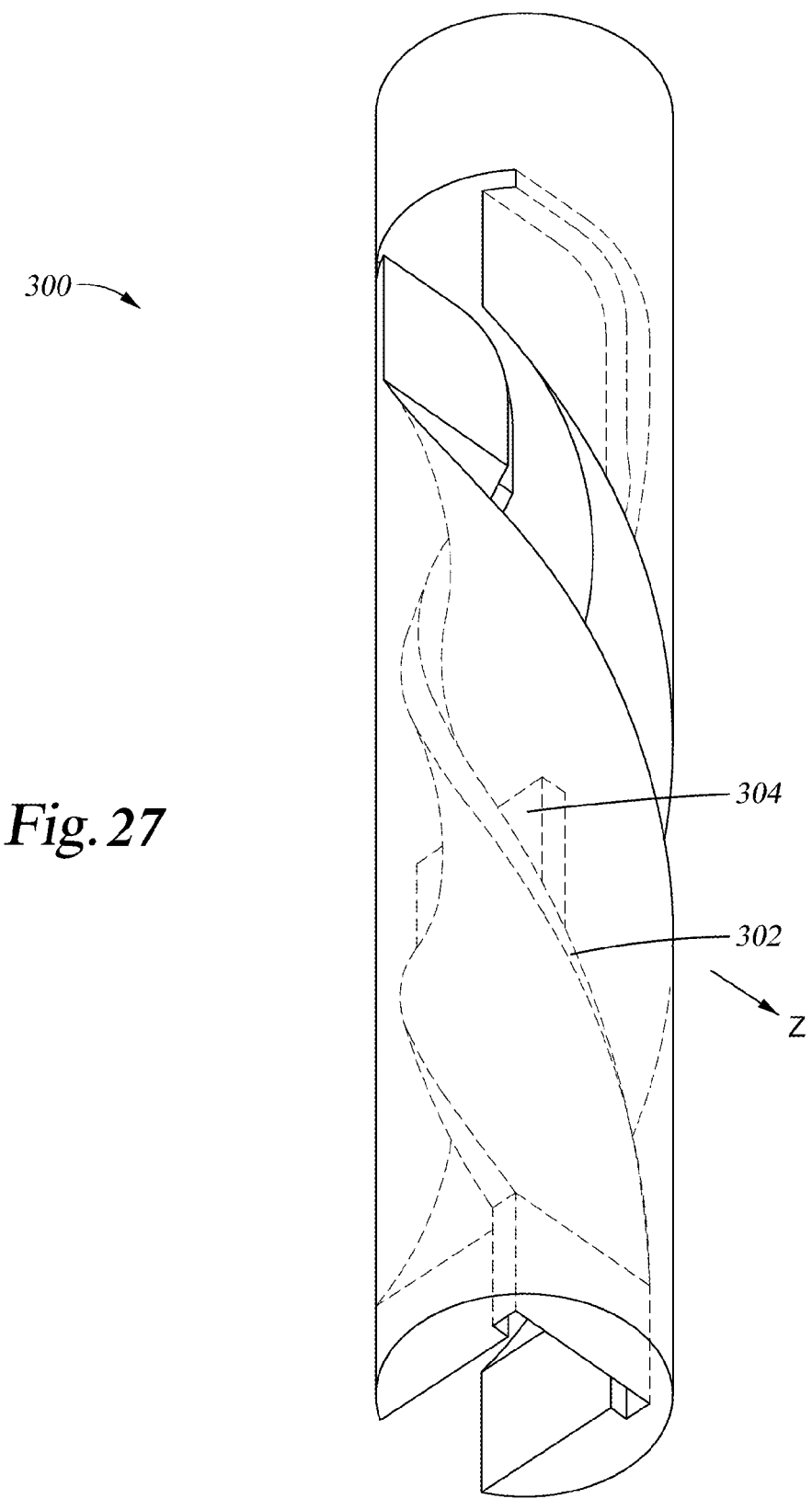
FIG. 27 shows the sensor of FIG. 26 moved along the track to a new Z axis orientation.
Figure 28:
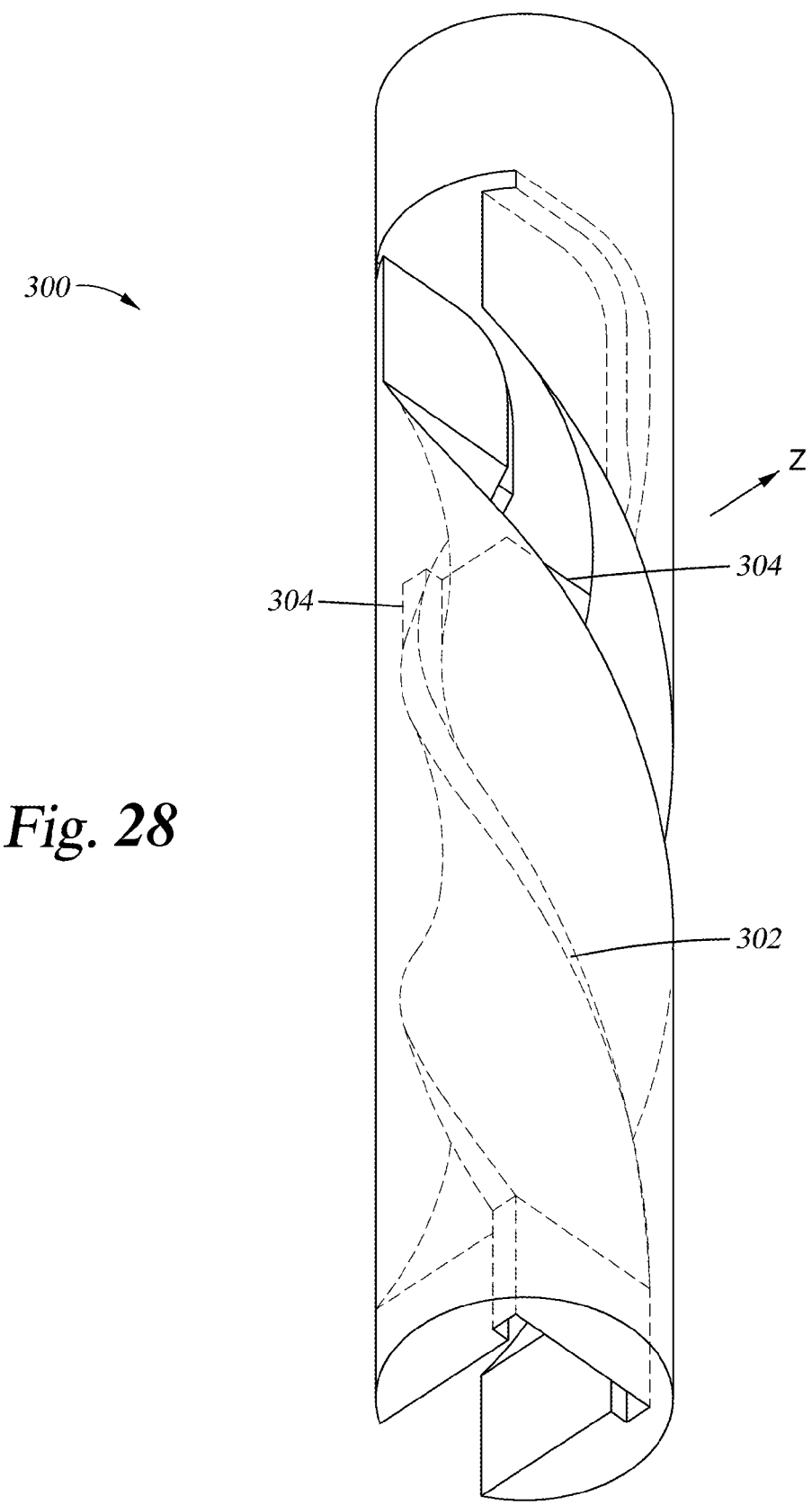
FIG. 28 shows the sensor of FIG. 27 moved further along the track to a new Z axis orientation as shown.
Figure 29:
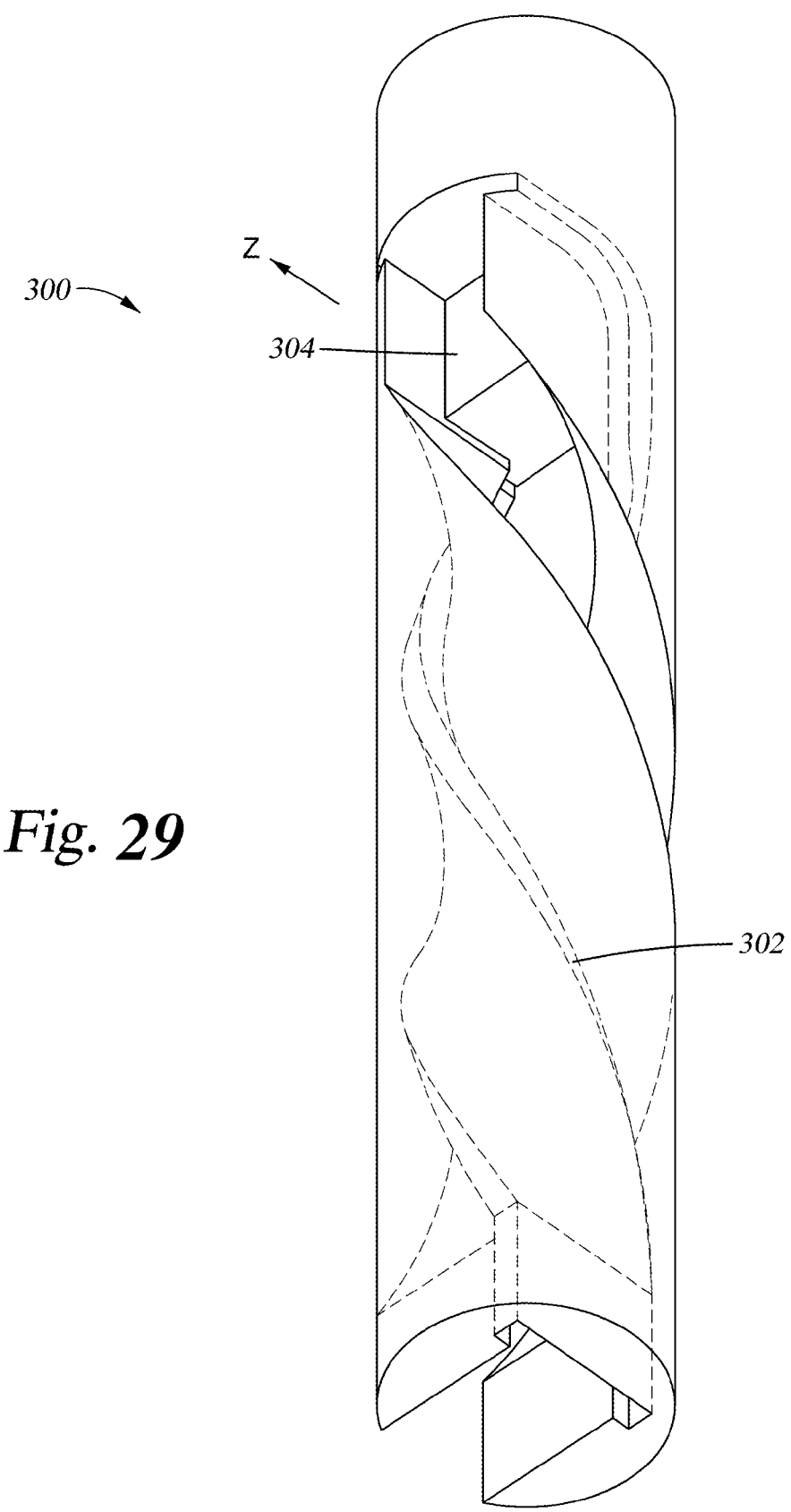
FIG. 29 shows the sensor of FIG. 28 moved even further along the track to another Z axis orientation.
Figure 30:
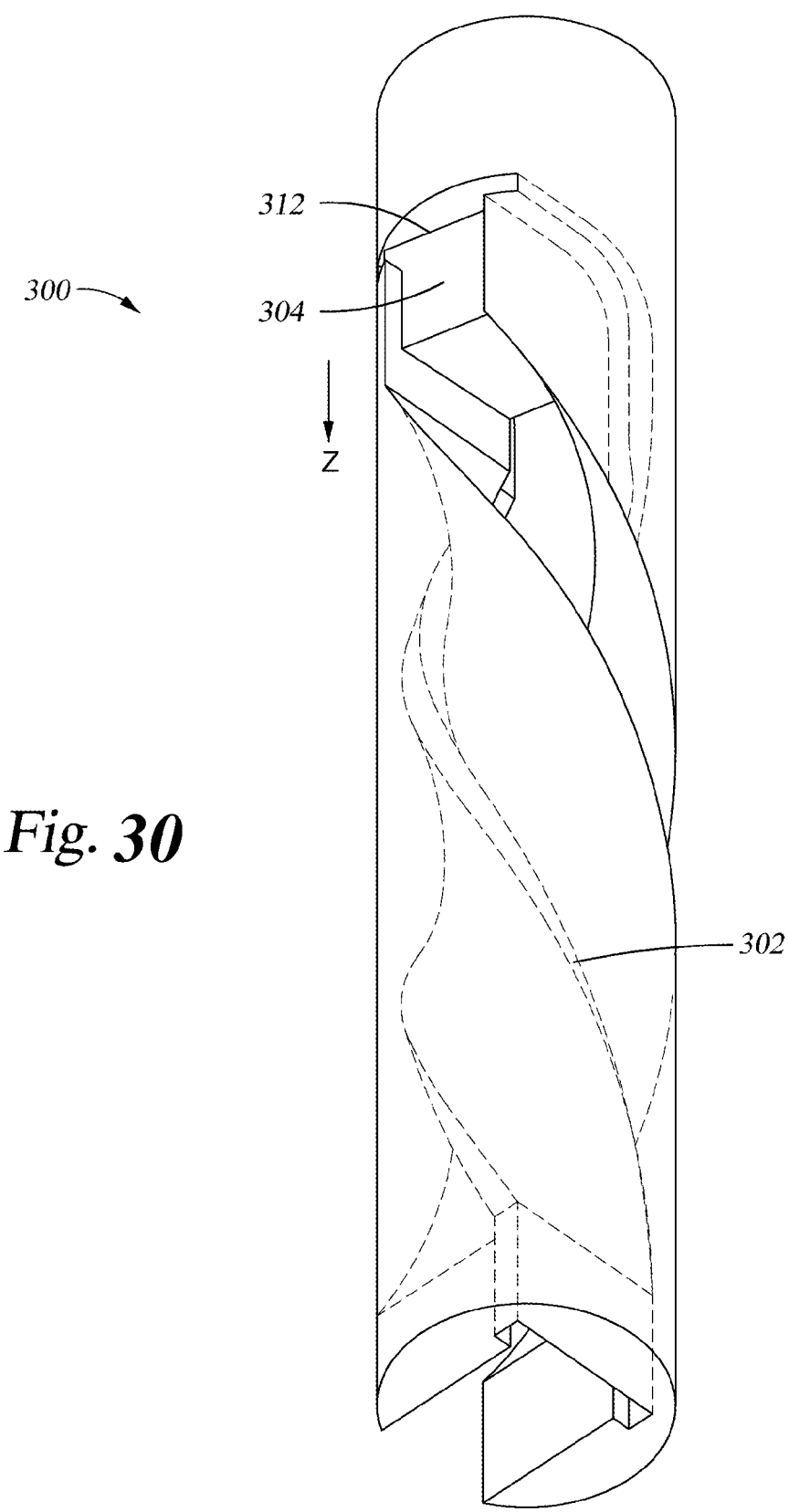
FIG. 30 shows the sensor of FIG. 29 moved still further along the track to a new Z axis orientation as shown.

Referring now to FIG. 27, the sensor 304 is urged or forced along the track 302. The force may be provided by driving means as described herein, or by the motions of the supporting drill string. In the new position of the sensor 304, the Z axis orientation has changed as shown. In FIG. 28, the sensor 304 has moved to a new position in the track 302 with the new Z axis orientation as shown. In FIG. 29, the sensor has moved further to another Z axis orientation. Finally, in FIG. 30, the sensor 304 stops in a slot 312 having the Z axis orientation shown. In some embodiments, the sensor 304 travels back through the helical track 302. In these embodiments, the spiral movement of the sensor 304 through the track 302 mimics various of the orientations in three orthogonal planes as described herein with respect to the gimbaling mechanisms. Measurements can be taken at the various orientations and calibration can be executed as also described herein.

For clarity in the following discussion, reference will be made to the sensor package 200 with the understanding the principles apply equally to the package 100 (or package 300). In exemplary embodiments, rotation or gimbaling of the sensing axis 215 of the sensor 214 is determined such that the three-dimensional orbits of the sensing axis cross three mutually orthogonal directions. In further embodiments, three-dimensional orbits are selected that cross the three mutually orthogonal directions in orientations that are 180 degree apart. In one embodiment, these three directions correspond to a direction along the drill string and tool axis, and two directions orthogonal to the drill string and tool axis. In an exemplary embodiment, a gear ratio for the gear assemblies disclosed herein of 2N/(2N−1), where N is greater than or equal to 1, produces orbits that contain at least one subset of points that define three mutually orthogonal axes and contact these axes at least twice, with pairs of contact points facing oppositely (i.e., 180 degrees apart).

In an exemplary embodiment, the sensor 214 (which, for example, may be a magnetometer or an accelerometer or a combination of both) is rotated or gimbaled such that its axis of sensitivity 215 is located orthogonal to the Z axis of the drill string and the package 200 (such as the positions in FIGS. 10, 12, 14, 15). Then, the outer cage 208 is rotated or carouseled to rotate the orthogonally oriented sensing axis 215 about the drill string and tool Z axis. Measurements are taken with the sensor 214. Additionally, the outer cage 208 can be carouseled while the inner gimbal 210 is rotated by the gearing assembly, as previously described, to guide the sensing axis 215 through multiple three-dimensional orbits as shown and described with reference to FIGS. 16 and 17, and which cross the three mutually orthogonal directions. Measurements are again taken with the sensor 214.

In some embodiments, the measurements are taken using a rotational check shot method, wherein the measurements are made at discrete rotational angles with the drill string stationary at each angle and at a constant depth. Further details of this method are found in U.S. Pat. No. 4,682,412. In other embodiments, the measurements are made at discrete rotational angles with the drill string stationary at each angle, but at different depths. Further details of this method are found in U.S. Pat. No. 5,806,194. In some embodiments, the measurements are made continually while the drill string is rotating, as disclosed in U.S. Patent Application Publication No. 2006/0106587.

The measurements taken as just described, can be used to determine scale factor and bias. Scale factor and bias (as well as misalignment terms) can be calculated. In some embodiments, the measurements taken by the sensor 214 are fitted to a sine wave with an offset. The offset provides the bias, and the amplitude provides the scale factor. In addition, the orbital and cross-orthogonal measurements taken with the system 200 allow for determination of bias and scale factor with a compensated measurement of one vector (i.e., magnetic field, gravitational field or the earth's spin axis).

Figure 10:
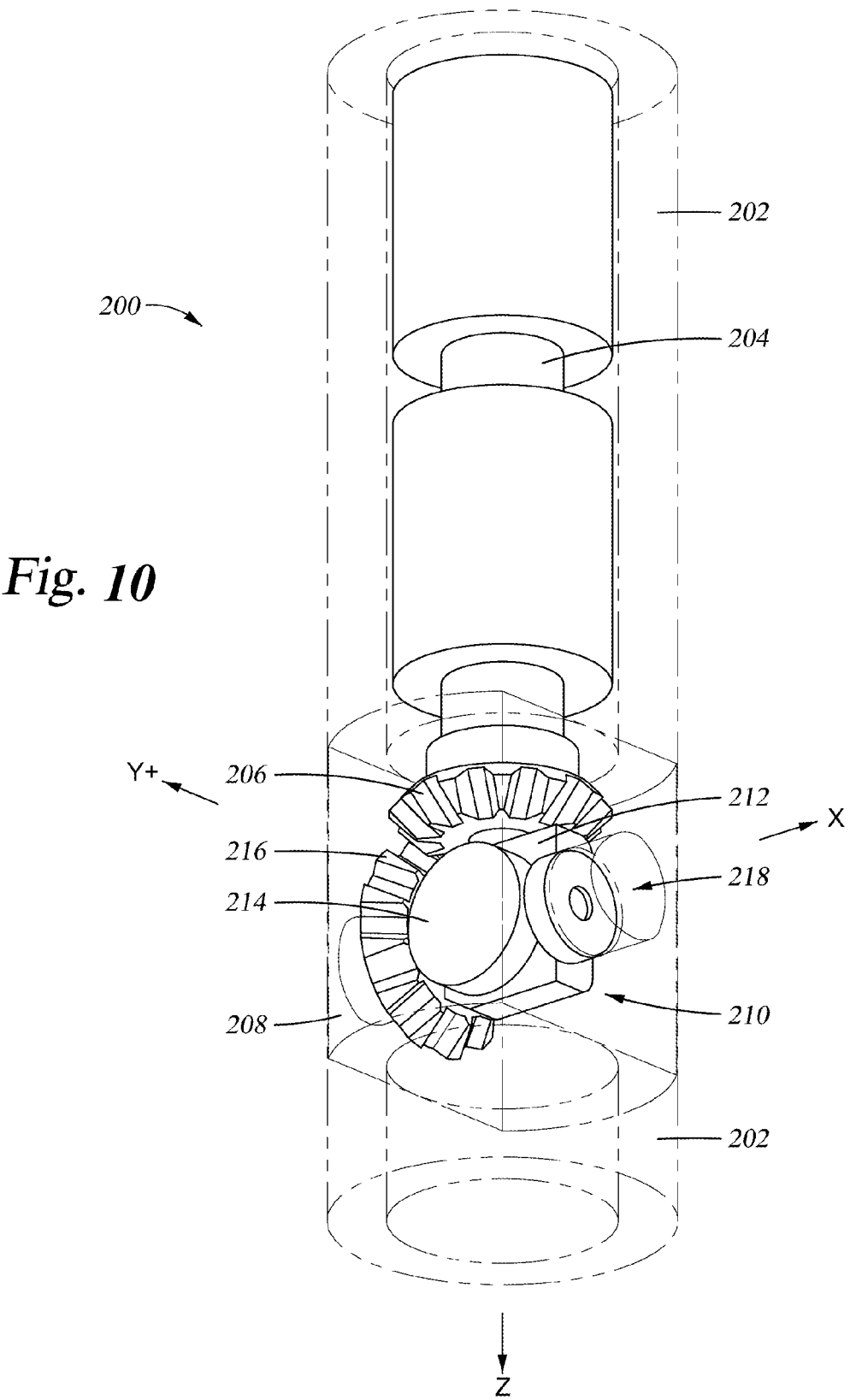
FIG. 10 is a phantom and perspective view of another sensor instrument package according to the principles disclosed herein, and showing sensor rotation components and a sensor aligned with a Y+ axis.

In some embodiments, the sensing axis 215 of the sensor 214 is flipped by 180° to allow for a measurement of bias. For example, the position of the sensor 214 in FIG. 10 compared to the position of FIG. 14 represents a 180° flip of the sensor 214. Likewise, FIG. 11 versus FIG. 13 and FIG. 12 versus FIG. 15. In some embodiments, the bias is calculated using digital processing.

The bias calculation is used to calibrate the sensor 214. In some embodiments, the scale factor is determined by normalizing the sum of all three measurements taken by the sensor 214 along the different orbital paths or cross-orthogonal directions. The sum of the squares of all three measurements equals the square of the particular field value being calibrated (e.g., the square of the local gravitational acceleration or the square of the magnitude of the local magnetic field value).

In further embodiments, measurements are taken while continuously manipulating the sensing axis around an orbit. In some embodiments, the sensor 214 is an accelerometer, and calibrating the accelerometer along the orbit allows for determining a tool inclination angle and a tool face value simultaneously with the sensor calibration parameters (i.e., scale factor, bias and misalignments). In some embodiments, the sensor 214 includes both an accelerometer and a magnetometer, and calibrating the sensors along the orbit allows for also determining a tool azimuth simultaneously with inclination, tool face, and the magnetometer calibration parameters (i.e., scale factor, bias and misalignment of the magnetometer). Consequently, in still further embodiments, the calibration parameters can be used as quality control parameters. A sudden discontinuity in any of the calibration parameters from an observed trend can provide a warning of impending sensor failure or of the possibility that a measurement includes errors. In exemplary embodiments, a linear trend of the calibration parameters as a function of time is used to note points that fall off the trend by more than a specified amount (e.g., 3 standard deviations). The linear trend is obtained either using a least squares fit or a Kalman filter, or in other ways for other embodiments.

In exemplary embodiments, a method of calibrating the orientation responsive sensor includes orienting the sensor with the axis of maximum sensitivity orthogonal to the tool axis, after which at least two measurements are taken in orientations that are orthogonal to the tool axis, the two measurements being 180 degrees apart. Next, the sensor is oriented with the axis of maximum sensitivity either parallel to the tool axis or anti-parallel to the tool axis. At least one measurement is made in this orientation. The two measurements in the first orthogonal position are cross-axial measurements and can be used to determine the bias of the sensor. The axial measurement can be corrected using this bias. Then the scale factor can be determined if the magnitude of the total field that the sensor is measuring is known, as is the case with the earth's gravitational field, magnetic field, or the earth's spin vector. The three measurements can then be used in a survey (or additional measurements can be taken).

In exemplary embodiments including a system with both an accelerometer and a magnetometer in the basket of the gimbaling apparatus, sensor measurements and orbital calibrations are used to simultaneously determine the inclination and the calibration parameters. A further method includes simultaneously determining the inclination, tool face and calibration parameters. A further method includes simultaneously determining the inclination, tool face, azimuth and calibration parameters.

In exemplary embodiments including a system with only an accelerometer in the basket of the gimbaling apparatus, sensor measurements and orbital calibrations are used to simultaneously determine the inclination and the calibration parameters. A further method includes simultaneously determining the inclination, tool face and calibration parameters.

In exemplary embodiments, a sensor package system includes only an accelerometer in the basket of the gimbaling apparatus and a three-axis magnetometer in a strap-down (conventional MWD surveying) configuration. A method includes simultaneously determining the inclination, tool face and calibration parameters of the accelerometer and determining the azimuth using the magnetometer readings, the inclination and the azimuth, as in conventional MWD surveying.

In exemplary embodiments, a system includes only an accelerometer in the basket of the gimbaling apparatus and a magnetometer 120 on a rotatable shaft separated from the inner gimbal. In a further embodiment, the apparatus includes at least one orientation sensitive sensor 125 mounted on the outer cage 108 (FIG. 8) which is rotatable about the body axis. In a further embodiment, the apparatus includes at least two orientation sensitive sensors 125 mounted on the outer cage 108 and which have sensing axes orthogonal to each other. In some embodiments, the orientation sensitive sensor(s) 125 mounted on the outer cage 108 is a magnetometer. In some embodiments, the orientation sensitive sensor(s) 125 mounted on the outer cage 108 is a gyroscope. A method includes simultaneously measuring inclination, tool face and accelerometer calibration parameters, and calibrating the bias of the magnetometers by making at least two measurements at different orientations of the outer housing 108. In some embodiments, the two measurements are 180 degrees apart. In some embodiments, the measurements are taken with the magnetometer at two orientations separated by 90 degrees. These measurements are used with the inclination and tool face to infer the azimuth as described in U.S. Pat. No. 4,510,696.

In exemplary embodiments, a system includes a magnetometer separate from the accelerometer in the inner gimbal, and oriented anywhere in the sensor package assembly (except the inner gimbal). The magnetometer is disposed in a gimbal that is set such that the magnetometer sensing axis is either along the drill string axis or anti-parallel to the drill string axis. A bias is obtained with parallel and anti-parallel measurements and used with the inclination, tool face and the other magnetometer measurements to infer azimuth.

In further embodiments of determining calibration parameters while, for example, determining inclination, a response model is defined for the system, making a set of measurements along an orbit, and conducting an iterative binary search for the bias, scale factor misalignment and inclination that give the best agreement within a pre-specified accuracy with the observed data. Further embodiments include tool face calculation with magnetometer parameter calculations and an azimuth calculation.

Disclosed herein are embodiments of in-situ calibration of cross-axial sensors (inclinometers or magnetometers or gyros) via the rotational and gimbaling mechanisms described. Such techniques can be applied to inclinometers, magnetometers, gyros and accelerometers used for downhole vibration and shock measurement.

Embodiments herein provide the ability to rotate or gimbal such orientation responsive sensors over a wide range of angles in a downhole environment, thereby making it possible to provide an in-situ calibration of the sensors, even in the presence of magnetic interference or magnetic shielding of the survey sensor as sometimes occurs due to presence of magnetic materials, such as iron filings, magnetite, ilmenite or hematite in the drilling mud.

During the sensor calibration, the magnitude and direction of the ambient field is known precisely and care is taken so as to assure that there is no magnetic interference or vibration during the calibration. When the calibration is expected to drift considerably with time, even at a fixed temperature, as may happen with high temperature operation (e.g., greater than about 190° C.), accurate surveys are only possible if the sensors can be calibrated in-situ, and in close time proximity to the time a survey is taken.

The embodiments disclosed herein make it possible to orient a specific sensor over a wide range of angles to calibrate a single axis (or multi-axis) accelerometer downhole. In some embodiments, a single axis accelerometer is used with the sensor packages and gimbaling mechanisms described herein effectively construct a 3-axis accelerometer. In this case, only one gain and one bias need be determined, and two misalignment angles are determined. These are the misalignments of the single axis accelerometer at its two cross-axial orientations. In some embodiments, a third misalignment angle is determined, namely the misalignment between the sense-axis of the single axis accelerometer and the drill string axis when the sensor chassis has oriented the sensor to the position it has designated as the drill string axis (which may, in fact, be somewhat off of the drill string axis). Since the magnitude of the earth's gravitational field is known, a minimum of two measurements at different orientations are needed to determine the gain and bias of the sensor, and a minimum of two further measurements at yet different orientations are needed to determine the misalignment angles.

In exemplary embodiments, a downhole sensor calibration apparatus includes a body having an axis, and a rotational mechanism supported by the body, the mechanism including at least one sensor, wherein the rotational mechanism is operable to rotate the sensor relative to three orthogonal axes. The rotational mechanism may be operable to rotate the sensor in three orthogonal planes. The rotational mechanism may include an outer cage rotatable about the body axis, and a sensor chassis supported in the outer cage and rotatable about an axis orthogonal to the body axis. The rotational mechanism may include a gimbaling mechanism. The gimbaling mechanism may include an inner gimbal rotatably supported in and relative to an outer gimbal. The outer gimbal may be rotatably supported by and relative to the body. The inner gimbal may include a basket containing the at least one sensor. The sensor may include an orientation responsive sensor. The sensor may include an accelerometer, a magnetometer, an inclinometer, a gyroscope, or a combination thereof. The rotational mechanism may contain a second sensor. The first sensor may include an accelerometer and the second sensor may include a magnetometer. A second sensor may be mounted outside of the rotational mechanism. A second sensor may be mounted on the outer cage and rotatable about the body axis. A third sensor may be mounted on the outer cage and rotatable about the body axis, wherein the second and third sensors include orientation sensitive sensors each having a sensing axis orthogonal to one another. The second and third sensors may include magnetometers, gyroscopes, or a combination thereof. A second sensor may be mounted on the outer gimbal and rotatable about the body axis. A third sensor may be mounted on the outer gimbal and rotatable about the body axis, wherein the second and third sensors include orientation sensitive sensors each having a sensing axis orthogonal to one another. The second and third sensors may include magnetometers, gyroscopes, or a combination thereof. The sensor chassis may include rotational support members to rotate a sensing axis of the sensor about the orthogonal axis. The sensor chassis may include a gear, wherein the gear is rotatably coupled to a second gear, wherein the gears include interlocking, beveled gears, wherein the second gear is coupled to a shaft, and wherein the shaft includes a second sensor mounted thereon, wherein the shaft is rotatably supported by and relative to the body along the body axis. The gears may include a gear ratio of 2:1 to provide a corresponding three-dimensional orbit of a sensing axis of the sensor. There may be multiple different three-dimensional orbits. The gears may include a gear ratio of 6:5 to provide a corresponding three-dimensional orbit of a sensing axis of the sensor. The rotational mechanism may include an internal helical track to receive the sensor. The sensor may include guide rails to mate with grooves in the helical track. The sensor may be movable along the helical track. The helical track may guide a sensing axis of the sensor about three orthogonal axes, in three orthogonal planes, along a three-dimensional orbit, or a combination thereof. The rotational mechanism may be operable to move a sensing axis of the sensor along a three-dimensional orbit. The three-dimensional orbit may be adjustable in response to a gear ratio.

In exemplary embodiments, a downhole sensor calibration apparatus includes a tool body having an axis, and a gimbaling mechanism rotatably coupling a first sensor into and relative to the tool body, the gimbaling mechanism further including an outer gimbal coupled to the tool body and rotatable relative to the tool body about the tool body axis and an inner gimbal retaining the first sensor and rotatable relative to the tool body and the outer gimbal to rotate a sensing axis of the first sensor about an axis orthogonal to the tool body axis. The inner and outer gimbals may be simultaneously rotatable. The sensing axis of first sensor may be moved along a three-dimensional orbit in response to rotation of the inner and outer gimbals. Interlocking gears may be coupled between the inner and outer gimbals. The three-dimensional orbit may be adjustable in response to a gear ratio of the interlocking gears. A second sensor may be mounted on the outer gimbal. A second sensor may be mounted apart from the gimbaling mechanism. The second sensor is mounted on a shaft coupled to the gimbaling mechanism.

In exemplary embodiments, a method of calibrating an orientation responsive sensor includes lowering a tool body including a gimbaling mechanism rotatably supporting the orientation responsive sensor into a subterranean reservoir; and rotating the sensor relative to three orthogonal axes using the gimbaling mechanism. The method further includes using the gimbaling mechanism to rotate the sensor in three orthogonal planes. The method further includes using the gimbaling mechanism to move a sensing axis of the sensor along a three-dimensional orbit. The three-dimensional orbit may cross three mutually orthogonal directions. Multiple three-dimensional orbits may cross the three mutually orthogonal directions in orientations that are 180 degrees apart. The three mutually orthogonal directions may include a tool body axis and two directions orthogonal to the tool body axis. The method further includes adjusting the three-dimensional orbit using a gear ratio. The method further includes rotating an outer gimbal relative to the tool body, and rotating an inner gimbal relative to the outer gimbal and the tool body to rotate the sensor. Rotating the inner gimbal may include moving an inner gimbal gear along a stationary gear. The method further includes moving the sensor along a helical track. The method further includes orienting a sensing axis of the sensor orthogonal to a tool body axis, taking a first measurement with the sensor at the first orientation, re-orienting the sensing axis to a second orientation orthogonal to the tool body axis by rotating the sensor using the gimbaling mechanism, and taking a second measurement with the sensor at the second orientation. The method further includes determining the bias of the sensor using the first and second cross-axial measurements. The first and second cross-axial measurements may be 180 degrees apart. The method further includes re-orienting the sensing axis to a third orientation parallel to the tool body axis by rotating the sensor using the gimbaling mechanism, taking a third measurement with the sensor at the third orientation, and correcting the third measurement using the bias. The method further includes determining a scale factor using a known magnitude of a total field measured by the sensor. The field may include at least one of the earth's gravitational field, the earth's magnetic field, and the earth's spin vector. The method further includes taking measurements with the sensor while rotating the sensor using the gimbaling mechanism. The method further includes taking measurements with the sensor while moving the sensing axis along the three-dimensional orbit. The method further includes taking measurements continuously with the sensor while moving the sensing axis along the three-dimensional orbit. The method further includes taking measurements with the sensor while stepping the sensing axis to discrete positions along the three-dimensional orbit. The method further includes wherein rotating the sensor includes rotating an accelerometer and a magnetometer using the gimbaling mechanism, taking measurements with the accelerometer and the magnetometer, and simultaneously determining an inclination and calibration parameters using the measurements. The method further includes determining a tool face simultaneously with determining the inclination and the calibration parameters. The method further includes determining an azimuth simultaneously with determining the inclination, the calibration parameters, and the tool face. The method further includes wherein rotating the sensor includes rotating an accelerometer using the gimbaling mechanism, taking measurements with the accelerometer, and simultaneously determining an inclination and calibration parameters using the measurements. The method further includes determining a tool face simultaneously with determining the inclination and the calibration parameters. The method further includes wherein rotating the sensor includes rotating an accelerometer using the gimbaling mechanism, taking measurements with the accelerometer, taking measurements with a three-axis magnetometer mounted apart from the gimbaling mechanism, and simultaneously determining an inclination, tool face and calibration parameters of the accelerometer using the measurements. The method further includes determining an azimuth using the magnetometer measurements simultaneously with determining the inclination and the calibration parameters. The method further includes wherein rotating the sensor includes rotating an accelerometer using the gimbaling mechanism, and taking measurements with the accelerometer. The method further includes taking measurements with a magnetometer mounted on a shaft coupled to the gimbaling mechanism. The gimbaling mechanism may include an inner gimbal retaining the accelerometer and an outer gimbal including an orientation sensitive sensor. The orientation sensitive sensor may include one of a magnetometer and a gyroscope. The outer gimbal may include at least two orientation sensitive sensors having sensing axes orthogonal to each other. The method further includes rotating the outer gimbal and taking at least two measurements at different orientations of the orientation sensitive sensors. The different orientations may be 180 degrees apart. The method further includes simultaneously determining an inclination, a tool face, and accelerometer calibration parameters using the measurements. The method further includes calibrating the bias of the orientation sensitive sensors using the measurements. The method further includes inferring an azimuth using the orientation sensitive sensor measurements, the inclination, and the tool face.

While specific embodiments have been shown and described, modifications can be made by one skilled in the art without departing from the spirit or teaching of this invention. The embodiments as described are exemplary only and are not limiting. Many variations and modifications are possible and are within the scope of the invention. Accordingly, the scope of protection is not limited to the embodiments described, but is only limited by the claims that follow, the scope of which shall include all equivalents of the subject matter of the claims.

What is claimed is:

1. A downhole sensor calibration apparatus comprising:
a body having an axis; and
a rotational mechanism supported by the body, the mechanism including at least one sensor;
wherein the rotational mechanism is operable to rotate the sensor relative to three orthogonal axes.

2. The apparatus of claim 1 wherein the rotational mechanism is operable to rotate the sensor in three orthogonal planes.

3. The apparatus of claim 1 wherein the rotational mechanism includes an outer cage rotatable about the body axis, and a sensor chassis supported in the outer cage and rotatable about an axis orthogonal to the body axis.

4. The apparatus of claim 3 wherein the sensor chassis comprises:
rotational support members to rotate a sensing axis of the sensor about the orthogonal axis; and
a gear;
wherein the gear is rotatably coupled to a second gear;
wherein the gears comprise interlocking, beveled gears; and
wherein the second gear is coupled to a rotatable shaft.

5. The apparatus of claim 4 wherein the gears comprise a gear ratio of 2:1 or 6:5 to provide a corresponding three-dimensional orbit of a sensing axis of the sensor.

6. The apparatus of claim 1 wherein the rotational mechanism comprises a gimbaling mechanism.

7. The apparatus of claim 1 wherein the at least one sensor comprises an orientation responsive sensor wherein a sensing axis of the sensor is sensitive to the orientation of the sensor.

8. The apparatus of claim 7 wherein the at least one sensor comprises an accelerometer, a magnetometer, an inclinometer, a gyroscope, or a combination thereof.

9. The apparatus of claim 1 wherein the rotational mechanism contains a second sensor.

10. The apparatus of claim 1 wherein a second sensor is mounted outside of the rotational mechanism.

11. The apparatus of claim 1 wherein the rotational mechanism is operable to move a sensing axis of the sensor along a three-dimensional orbit.

12. The apparatus of claim 11 wherein the three-dimensional orbit is adjustable in response to a gear ratio.

13. A downhole sensor calibration apparatus comprising:
a tool body having an axis; and
a gimbaling mechanism rotatably coupling a first sensor into and relative to the tool body, the gimbaling mechanism further comprising:
an outer gimbal coupled to the tool body and rotatable relative to the tool body about the tool body axis; and
an inner gimbal retaining the first sensor and rotatable relative to the tool body and the outer gimbal to rotate a sensing axis of the first sensor about two axes orthogonal to the tool body axis.

14. The apparatus of claim 13 wherein the inner and outer gimbals are simultaneously rotatable.

15. The apparatus of claim 14 wherein the sensing axis of first sensor is moved along a three-dimensional orbit in response to rotation of the inner and outer gimbals.

16. The apparatus of claim 15 wherein interlocking gears are coupled between the inner and outer gimbals.

17. The apparatus of claim 16 wherein the three-dimensional orbit is adjustable in response to a gear ratio of the interlocking gears.

18. A method of calibrating an orientation responsive sensor comprising:
lowering a tool body including a gimbaling mechanism rotatably supporting the orientation responsive sensor into a subterranean reservoir; and rotating the sensor relative to three orthogonal axes using the gimbaling mechanism.

19. The method of claim 18 further comprising using the gimbaling mechanism to rotate the sensor in three orthogonal planes.

20. The method of claim 18 further comprising using the gimbaling mechanism to move a sensing axis of the sensor along a three-dimensional orbit.

21. The method of claim 20 wherein the three-dimensional orbit crosses three mutually orthogonal directions.

22. The method of claim 21 wherein the three mutually orthogonal directions comprise a tool body axis and two directions orthogonal to the tool body axis.

23. The method of claim 20 further comprising adjusting the three-dimensional orbit using a gear ratio.

24. The method of claim 18 further comprising:
rotating an outer gimbal relative to the tool body; and
rotating an inner gimbal relative to the outer gimbal and the tool body to rotate the sensor.

25. The method of claim 18 further comprising:
orienting a sensing axis of the sensor orthogonal to a tool body axis;
taking a first measurement with the sensor at the first orientation;
re-orienting the sensing axis to a second orientation orthogonal to the tool body axis by rotating the sensor using the gimbaling mechanism; and
taking a second measurement with the sensor at the second orientation.

26. The method of claim 25 further comprising determining the bias of the sensor using the first and second cross-axial measurements.

27. The method of claim 26 further comprising:
re-orienting the sensing axis to a third orientation parallel to the tool body axis by rotating the sensor using the gimbaling mechanism;
taking a third measurement with the sensor at the third orientation; and
correcting the third measurement using the bias.

28. The method of claim 27 further comprising:
determining a scale factor using a known magnitude of a total field measured by the sensor.

29. The method of claim 18 further comprising:
wherein rotating the sensor comprises rotating an accelerometer and a magnetometer using the gimbaling mechanism;
taking measurements with the accelerometer and the magnetometer; and
simultaneously determining an inclination and calibration parameters using the measurements.

30. The method of claim 29 further comprising determining a tool face simultaneously with determining the inclination and the calibration parameters.

31. The method of claim 30 further comprising determining an azimuth simultaneously with determining the inclination, the calibration parameters, and the tool face.

32. The method of claim 18 further comprising:
wherein rotating the sensor comprises rotating an accelerometer using the gimbaling mechanism;
taking measurements with the accelerometer; and
simultaneously determining an inclination and calibration parameters using the measurements.

33. The method of claim 18 further comprising:
wherein rotating the sensor comprises rotating an accelerometer using the gimbaling mechanism;
taking measurements with the accelerometer;
taking measurements with a three-axis magnetometer mounted apart from the gimbaling mechanism; and
simultaneously determining an inclination, tool face and calibration parameters of the accelerometer using the measurements.

34. The method of claim 18 further comprising:
wherein rotating the sensor comprises rotating an accelerometer using the gimbaling mechanism; and
taking measurements with the accelerometer.

35. The method of claim 34 further comprising taking measurements with a magnetometer mounted on a shaft coupled to the gimbaling mechanism.

* * * * *

UNITED STATES PATENT AND TRADEMARK OFFICE
CERTIFICATE OF CORRECTION

PATENT NO.      : 8,528,381 B2                                  Page 1 of 1
APPLICATION NO. : 13/129366
DATED           : September 10, 2013
INVENTOR(S)     : Rodney et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 69 days.

Signed and Sealed this
Fifteenth Day of September, 2015

Michelle K. Lee
*Director of the United States Patent and Trademark Office*